US012793541B2

(12) United States Patent
Fei et al.

(10) Patent No.: US 12,793,541 B2
(45) Date of Patent: Nov. 10, 2026

(54) VEHICLE MATCHING METHOD AND APPARATUS, DEVICE, STORAGE MEDIUM, AND COMPUTER PROGRAM PRODUCT

(71) Applicant: TENCENT TECHNOLOGY (SHENZHEN) COMPANY LIMITED, Shenzhen (CN)

(72) Inventors: Cong Fei, Shenzhen (CN); Dong Li, Shenzhen (CN); Jingbing Cui, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 71 days.

(21) Appl. No.: 18/938,849

(22) Filed: Nov. 6, 2024

(65) Prior Publication Data

US 2025/0061801 A1 Feb. 20, 2025

Related U.S. Application Data

(63) Continuation of application No. PCT/CN2023/125958, filed on Oct. 23, 2023.

(30) Foreign Application Priority Data

Dec. 30, 2022 (CN) ........................ 202211726568.2

(51) Int. Cl.
*G08G 1/01* (2006.01)
*G08G 1/052* (2006.01)

(52) U.S. Cl.
CPC ......... *G08G 1/0125* (2013.01); *G08G 1/0112* (2013.01); *G08G 1/052* (2013.01)

(58) Field of Classification Search
None
See application file for complete search history.

(56) References Cited

U.S. PATENT DOCUMENTS

| | | | | |
|---|---|---|---|---|
| 2014/0244164 A1 | 8/2014 | William et al. | | |
| 2021/0280064 A1* | 9/2021 | Takla | ..................... | G08G 1/164 |

(Continued)

FOREIGN PATENT DOCUMENTS

| | | |
|---|---|---|
| CN | 104616502 B | 3/2017 |
| CN | 112261093 A | 1/2021 |

(Continued)

OTHER PUBLICATIONS

The World Intellectual Property Organization (WIPO) International Search Report for PCT/CN2023/125958 Jan. 11, 2024 5 Pages (including translation).

(Continued)

*Primary Examiner* — Hitesh Patel
*Assistant Examiner* — Wenyuan Yang
(74) *Attorney, Agent, or Firm* — ANOVA LAW GROUP, PLLC

(57) ABSTRACT

A vehicle matching method includes obtaining floating vehicle data of a target vehicle including a geographic location of the target vehicle, determining a candidate geographic region covering a current geographic location at a current frame moment, obtaining candidate vehicle sensing data of at least one candidate vehicle in the candidate geographic region, calculating a relative location error degree between each target vehicle and the candidate vehicle based on the floating vehicle data and the candidate vehicle sensing data, calculating a matching confidence between each target vehicle and the candidate vehicle based on the relative location error degree between the target vehicle and the candidate vehicle, and selecting, from the at least one candidate vehicle, a matching candidate vehicle. The relative location error degree of the matching candidate vehicle satisfies an error-degree threshold condition, and the match- (Continued)

ing confidence of the matching candidate vehicle satisfies a confidence threshold condition.

20 Claims, 10 Drawing Sheets

(56) References Cited

U.S. PATENT DOCUMENTS

| | | | | |
|---|---|---|---|---|
| 2022/0034999 | A1* | 2/2022 | Itoh | G01S 7/40 |
| 2022/0343757 | A1* | 10/2022 | Uchiyama | B60W 40/04 |

FOREIGN PATENT DOCUMENTS

| | | | |
|---|---|---|---|
| CN | 113420650 | A | 9/2021 |
| CN | 114202912 | A | 3/2022 |
| CN | 114503177 | A | 5/2022 |
| CN | 114842439 | A | 8/2022 |
| WO | 2022007776 | A1 | 1/2022 |

OTHER PUBLICATIONS

Wright Matthew et al., "Fusing Loop and GPS Probe Measurements to Estimate Freeway Density" IEEE Transactions on Intelligent Transportation Systems, vol. 17. No. 12, Dec. 2016.

The European Patent Office (EPO) The Extended European Search Report for 23909521.9 Mar. 4, 2026 9 Pages (including translation).

* cited by examiner

VEHICLE MATCHING METHOD AND APPARATUS, DEVICE, STORAGE MEDIUM, AND COMPUTER PROGRAM PRODUCT

CROSS-REFERENCE TO RELATED APPLICATIONS

This application is a continuation of International Application No. PCT/CN2023/125958, filed on Oct. 23, 2023, which claims priority to Chinese Patent Application No. 202211726568.2, entitled "VEHICLE MATCHING METHOD AND APPARATUS, DEVICE, STORAGE MEDIUM, AND COMPUTER PROGRAM PRODUCT" and filed on Dec. 30, 2022, which are incorporated herein by reference in their entirety.

FIELD OF THE TECHNOLOGY

This application relates to the field of vehicle technologies, and in particular, to a vehicle matching method and apparatus, a computer device, a storage medium, and a computer program product.

BACKGROUND OF THE DISCLOSURE

With the development of computer technologies and Internet technologies, to ensure safe traveling of a vehicle, a vehicle-infrastructure cooperation technology emerges. The vehicle-infrastructure cooperation technology can implement dynamic real-time information exchange between vehicles or between a vehicle and an infrastructure in all aspects, and perform active vehicle safety control and cooperative road management based on collection and fusion of dynamic traffic information at all moments.

In the vehicle-infrastructure cooperation technology, only when vehicle data of a target vehicle is matched with vehicle data of another vehicle sensed on a road surface, real-time information exchange can be implemented, and the vehicle and another road traffic participator are assisted in making safer and more efficient decisions.

Currently, an integrated inertial navigation device and a real-time kinematic (RTK) technology are usually used to match vehicle data with a vehicle on a road, and there is a problem of low vehicle matching accuracy.

SUMMARY

In accordance with the disclosure, there is provided a vehicle matching method including obtaining floating vehicle data of a target vehicle that is collected frame by frame by a positioning device at the target vehicle and includes a geographic location of the target vehicle, determining, based on a current geographic location at a current frame moment, a candidate geographic region covering the current geographic location, obtaining candidate vehicle sensing data of at least one candidate vehicle in the candidate geographic region that is collected frame by frame by a sensing device located in the candidate geographic region, calculating a relative location error degree between each of the at least one target vehicle and the candidate vehicle based on the floating vehicle data at the current frame moment and the candidate vehicle sensing data at the current frame moment, calculating a matching confidence between each of the at least one target vehicle and the candidate vehicle at the current frame moment based on the relative location error degree between the target vehicle and the candidate vehicle at the current frame moment, and selecting, from the at least one candidate vehicle, a matching candidate vehicle that successfully matches the target vehicle at the current frame moment. The relative location error degree of the matching candidate vehicle satisfies an error-degree threshold condition, and the matching confidence of the matching candidate vehicle satisfies a confidence threshold condition.

Also in accordance with the disclosure, there is provided a computer device including one or more memories storing computer-readable instructions, and one or more processors configured to execute the computer-readable instructions to obtain floating vehicle data of a target vehicle that is collected frame by frame by a positioning device at the target vehicle and includes a geographic location of the target vehicle, determine, based on a current geographic location at a current frame moment, a candidate geographic region covering the current geographic location, obtain candidate vehicle sensing data of at least one candidate vehicle in the candidate geographic region that is collected frame by frame by a sensing device located in the candidate geographic region, calculate a relative location error degree between each of the at least one target vehicle and the candidate vehicle based on the floating vehicle data at the current frame moment and the candidate vehicle sensing data at the current frame moment, calculate a matching confidence between each of the at least one target vehicle and the candidate vehicle at the current frame moment based on the relative location error degree between the target vehicle and the candidate vehicle at the current frame moment, and select, from the at least one candidate vehicle, a matching candidate vehicle that successfully matches the target vehicle at the current frame moment. The relative location error degree of the matching candidate vehicle satisfies an error-degree threshold condition, and the matching confidence of the matching candidate vehicle satisfies a confidence threshold condition.

Also in accordance with the disclosure, there is provided a non-transitory computer-readable storage medium storing computer-readable instructions that, when executed by one or more processors, cause the one or more processors to obtain floating vehicle data of a target vehicle that is collected frame by frame by a positioning device at the target vehicle and includes a geographic location of the target vehicle, determine, based on a current geographic location at a current frame moment, a candidate geographic region covering the current geographic location, obtain candidate vehicle sensing data of at least one candidate vehicle in the candidate geographic region that is collected frame by frame by a sensing device located in the candidate geographic region, calculate a relative location error degree between each of the at least one target vehicle and the candidate vehicle based on the floating vehicle data at the current frame moment and the candidate vehicle sensing data at the current frame moment, calculate a matching confidence between each of the at least one target vehicle and the candidate vehicle at the current frame moment based on the relative location error degree between the target vehicle and the candidate vehicle at the current frame moment, and select, from the at least one candidate vehicle, a matching candidate vehicle that successfully matches the target vehicle at the current frame moment. The relative location error degree of the matching candidate vehicle satisfies an error-degree threshold condition, and the matching confidence of the matching candidate vehicle satisfies a confidence threshold condition.

BRIEF DESCRIPTION OF THE DRAWINGS

To describe the technical solutions in embodiments of this application or the conventional art more clearly, the accompanying drawings required for describing the embodiments or the conventional art are briefly described below. It is clear that the accompanying drawings in the following descriptions are merely embodiments of this application, and a person of ordinary skill in the art may further derive other drawings based on the disclosed accompanying drawings without creative efforts.

DESCRIPTION OF EMBODIMENTS

Figure 1:
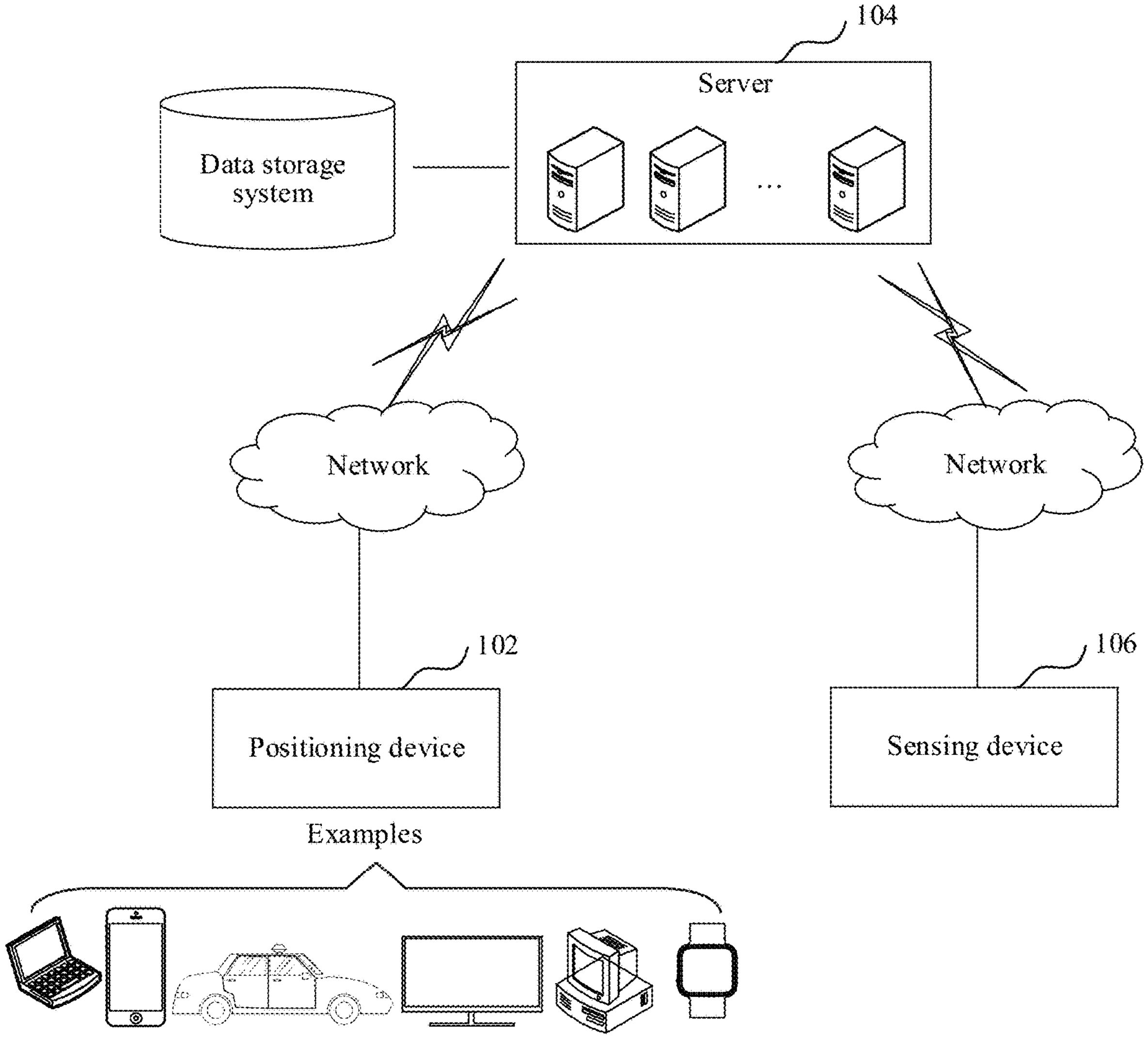
FIG. 1 is a diagram of an application environment of a vehicle matching method according to an embodiment.

The technical solutions in embodiments of this application are clearly and completely described below with reference to the accompanying drawings of the embodiments of this application. It is clear that the described embodiments are a part of the embodiments of this application, rather than all of the embodiments. Based on the embodiments of this application, all other embodiments obtained by a person of ordinary skill in the art without creative efforts shall fall within the protection scope of this application.

In a related art, an integrated inertial navigation device, an RTK device, and the like are usually used to perform primary vehicle matching. Specifically, vehicle information of a to-be-matched vehicle is obtained by using the integrated inertial navigation device, the RTK device, and the like, and the vehicle information of the to-be-matched vehicle is matched one-by-one with vehicle information identified through sensing. However, when primary vehicle matching is performed by using the integrated inertial navigation device, the RTK device, and the like, there is a problem of low vehicle matching accuracy.

According to a vehicle matching method provided in the embodiments of this application, floating vehicle data of a target vehicle is obtained, where the floating vehicle data is collected frame by frame by a positioning device in the target vehicle, and the floating vehicle data includes a geographic location of the target vehicle, so that floating vehicle data respectively corresponding to each frame moment can be determined in real time. Therefore, a candidate geographic region covering a geographic location that is at a current frame moment can be effectively and accurately determined based on the geographic location. In this way, a vehicle in the candidate geographic region is directly determined as a candidate vehicle to be matched with the target vehicle. In addition, a sensing device deployed in the candidate geographic region collects candidate vehicle sensing data of at least one candidate vehicle in the candidate geographic region. A relative location error degree between the target vehicle and each candidate vehicle is calculated based on the floating vehicle data and that candidate vehicle sensing data that are at the current frame moment. In other words, a proximity degree between each candidate vehicle and the target vehicle can be intuitively reflected based on the relative location error degree between the target vehicle and each candidate vehicle. Further, to correct a matching error caused by the relative location error degree, credibility of each relative location error degree is considered. In other words, a matching confidence that is between the target vehicle and each candidate vehicle and that is at the current frame moment is calculated based on the relative location error degree that is between the target vehicle and each candidate vehicle and that is at the current frame moment. In other words, the credibility of each relative location error degree is further evaluated based on the matching confidence. In this way, a candidate vehicle whose relative location error degree with the target vehicle satisfies an error-degree threshold condition and whose matching confidence with the target vehicle satisfies a confidence threshold condition can be accurately selected from the at least one candidate vehicle. In this way, the selected candidate vehicle can be directly determined as a candidate vehicle successfully matching the target vehicle. In other words, a location of the target vehicle is optimally estimated based on the relative location error degree that can accurately reflect the proximity degree between each candidate vehicle and the target vehicle and the matching confidence that can be configured for accurately evaluating the credibility of the relative location error degree, to accurately match a vehicle, in other words, improve vehicle matching accuracy.

The vehicle matching method provided in the embodiments of this application may be applied to an application environment shown in FIG. 1. A positioning device 102 communicates with a server 104 through a network, and a sensing device 106 communicates with the server 104 through the network. A data storage system may store data that needs to be processed by the server 104. The data storage system may be integrated on the server 104, or may be disposed on a cloud or another server. The positioning device is configured to collect, in real time, related data of a vehicle on which the positioning device is located. For example, the positioning device is deployed on a target vehicle, and a speed, an acceleration, and the like of the target vehicle can be collected in real time by the positioning device. The sensing device is deployed in an environment, and is configured to collect, in real time, data related to each vehicle in the environment in which the sensing device is located. For example, the sensing device is deployed in a tunnel, and the sensing device is configured to collect a speed, an acceleration, and the like of each vehicle in the tunnel in real time.

In some embodiments, the server 104 obtains floating vehicle data of a target vehicle, where the floating vehicle data is collected frame by frame by the positioning device 102 in the target vehicle, and the positioning device sends the floating vehicle data of the target vehicle to the server 102. The floating vehicle data includes a geographic location of the target vehicle. The server 104 determines, based on a geographic location that is at a current frame moment (also referred to as a "current geographic location"), a candidate geographic region covering the geographic location at the current frame moment. The server 104 obtains candidate vehicle sensing data of at least one candidate vehicle in the candidate geographic region. The candidate vehicle sensing data is collected frame by frame by the sensing device 106 in the candidate geographic region. In addition, the sensing device 106 sends the collected candidate vehicle sensing data of the at least one candidate vehicle to the server 104. The server 104 calculates a relative location error degree between the target vehicle and each candidate vehicle based on the floating vehicle data and the candidate vehicle sensing data that are at the current frame moment. The server 104 calculates a matching confidence that is between the target vehicle and each candidate vehicle and that is at the current frame moment based on the relative location error degree that is between the target vehicle and each candidate vehicle and that is at the current frame moment. The server 104 selects, from the at least one candidate vehicle, a candidate vehicle whose relative location error degree with the target vehicle satisfies an error-degree threshold condition and whose matching confidence with the target vehicle satisfies a confidence threshold condition. The server 104 uses the selected candidate vehicle as a candidate vehicle successfully matching the target vehicle at the current frame moment.

The positioning device 102 is a device having a positioning function. For example, the positioning device 102 may be, but is not limited to, various personal computers, a notebook computer, a smartphone, a tablet computer, an Internet of Things (IoT) device, and a portable wearable device that are loaded with the positioning function. The Internet of Things device may be a smart speaker, a smart television, a smart air conditioner, a smart vehicle-mounted device, or the like. The portable wearable device may be a smart watch, a smart bracelet, a head-mounted device, or the like. The server 104 may be implemented by using an independent server or a server cluster including a plurality of servers. The sensing device 106 is a device having a sensing function. For example, the sensing device 106 may be, but is not limited to, a camera device, a laser radar device, or a millimeter wave radar device that has the sensing function.

Figure 2:
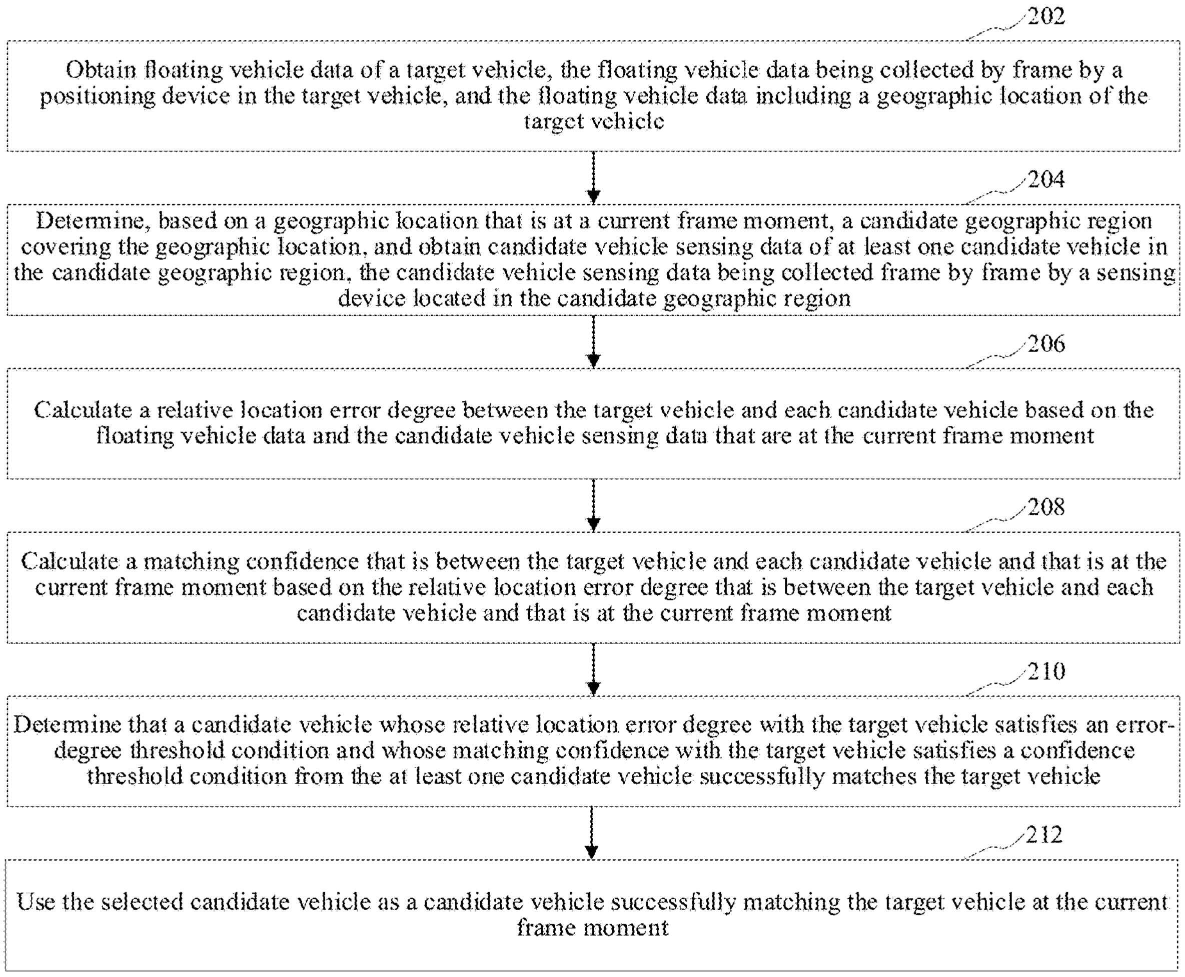
FIG. 2 is a schematic flowchart of a vehicle matching method according to an embodiment.

In an embodiment, as shown in FIG. 2, a vehicle matching method is provided. An example in which the method is applied to the server 104 in FIG. 1 is used for description. The method includes the following operations.

Operation 202: Obtain floating vehicle data of a target vehicle, the floating vehicle data being collected frame by frame by a positioning device in the target vehicle, and the floating vehicle data including a geographic location of the target vehicle.

The target vehicle is a vehicle on which vehicle matching is to be performed. The target vehicle is loaded with the positioning device. In some embodiments, the positioning device is a device having a positioning function. For example, the positioning device may be a vehicle-mounted navigation device, may be a vehicle-mounted device having the positioning function, or may be a mobile terminal having the positioning function. For example, the vehicle-mounted device having the positioning function may be an on board unit (OBU) device. The mobile terminal having the positioning function may be a mobile terminal having a global positioning system (GPS) or a mobile terminal having a BeiDou navigation satellite system (BDS). This is not specifically limited.

The positioning device is configured to collect the floating vehicle data (FCD for short) of the target vehicle. Because the positioning device is deployed in the target vehicle, the target vehicle has the positioning function. Therefore, the target vehicle may also be considered as a floating vehicle (a vehicle having the positioning function). For example, the target vehicle is a taxi or a private car. This is not specifically limited. The floating vehicle data represents data of vehicle information of the target vehicle. For example, the floating vehicle data includes a location, traveling duration, a speed, an acceleration, or an azimuth of the target vehicle. This is not specifically limited. In some embodiments, the positioning device collects the floating vehicle data of the target vehicle according to a collection instruction. The collection instruction is generated based on a trigger operation of a user on the positioning device. In some embodiments, the positioning device collects the floating vehicle data of the target vehicle in real time. For example, the positioning device collects the floating vehicle data of the target vehicle frame by frame. Collection frame by frame may be understood as collection based on frame moment. A frame moment refers to a moment at which a frame of data is collected. Therefore, each frame of the floating vehicle data is floating vehicle data at each moment, for example, floating vehicle data at the $1^{st}$ frame moment, floating vehicle data at the $2^{nd}$ frame moment, . . . , and floating vehicle data at the $m^{th}$ frame moment.

The floating vehicle data includes the geographic location of the target vehicle. The geographic location represents a location of the target vehicle in geography.

In some embodiments, the positioning device in the target vehicle collects the floating vehicle data of the target vehicle by frame, and sends the floating vehicle data collected frame by frame to the server. The server obtains the floating vehicle data of the target vehicle.

For example, the positioning device in the target vehicle collects the floating vehicle data that is of the target vehicle and that is at each frame moment, and the positioning device sequentially sends the floating vehicle data that is at each frame moment to the server in real time. The server obtains the floating vehicle data that is at each frame moment.

Operation 204: Determine, based on a geographic location at a current frame moment, a candidate geographic region covering the geographic location, and obtain candidate vehicle sensing data of at least one candidate vehicle in the candidate geographic region, the candidate vehicle sensing data being collected frame by frame by a sensing device located in the candidate geographic region.

The geographic location that is at the current frame moment is a geographic location of the target vehicle that is collected by the positioning device at the current frame moment, that is, a geographic location of the target vehicle that is collected at a latest frame moment. The candidate geographic region is a geographic region in which the candidate vehicle is located. Further, the positioning device in the target vehicle uploads, at the current frame moment, the geographic location that is of the target vehicle and that is at the current frame moment to the server. In this case, the candidate geographic region covering the geographic location refers to a geographic region including the geographic location. The candidate geographic region includes the at least one candidate vehicle. The candidate vehicle is a vehicle that performs vehicle matching with the target vehicle.

The sensing device is a device having a sensing function, to be specific, a device that can sense an environment surrounding the vehicle. For example, the sensing device may be a video camera, a laser radar, a millimeter wave radar, or an ultrasonic radar that has the sensing function.

This is not specifically limited. The sensing device is a device deployed on a road. The sensing device is configured to collect the candidate vehicle sensing data of the candidate vehicle on the road. The candidate vehicle sensing data represents data of vehicle information of the candidate vehicle. For example, the candidate vehicle sensing data of the candidate vehicle includes a location, traveling duration, a speed, an acceleration, or an azimuth of the target vehicle. This is not specifically limited. At least one sensing device is deployed in the candidate geographic region, and the at least one sensing device obtains the candidate vehicle sensing data of each candidate vehicle in the candidate geographic region in real time.

In some embodiments, the server obtains floating vehicle data that is at the current frame moment, and determines the geographic location that is of the target vehicle and that is at the current frame moment based on the floating vehicle data that is at the current frame moment. The server selects, from a preset geographic region based on the geographic location that is of the target vehicle and that is at the current frame moment, a geographic region including at least the geographic location, and determines the selected geographic region as the candidate geographic region. The server obtains the candidate vehicle sensing data of the at least one candidate vehicle in the candidate geographic region. The candidate vehicle sensing data of the at least one candidate vehicle is collected frame by frame by the at least one sensing device deployed in the candidate geographic region. The preset geographic region is a preset geographic range. The preset geographic region is larger than or equal to the candidate geographic region.

For example, the server obtains the floating vehicle data that is at the current frame moment from floating vehicle data that is of the target vehicle and that is at least one frame moment, and parses out, from the floating vehicle data that is at the current frame moment, the geographic location that is of the target vehicle and that is at the current frame moment. The server determines the candidate geographic region by using the geographic location that is of the target vehicle and that is at the current frame moment as a circle center of the candidate geographic region and using a preset region distance as a radius. A distance between each candidate vehicle in the candidate geographic region and the target vehicle is not greater than the preset region distance. The server obtains the candidate vehicle sensing data that is at the current frame moment and that is sent by the at least one sensing device in the candidate geographic region.

For example, the server obtains the floating vehicle data that is at the current frame moment from floating vehicle data that is of the target vehicle and that is at least one frame moment, and parses out, from the floating vehicle data that is at the current frame moment, the geographic location that is of the target vehicle and that is at the current frame moment. The server obtains a preset geographic-grid set, and determines, based on the preset geographic-grid set, a target geographic grid in which the geographic location that is at the current frame moment is located. The server uses a geographic region including the target geographic grid as the candidate geographic region. The candidate geographic region includes at least the target geographic grid. The server obtains the candidate vehicle sensing data that is at the current frame moment and that is sent by the at least one sensing device in the candidate geographic region.

Figure 3:
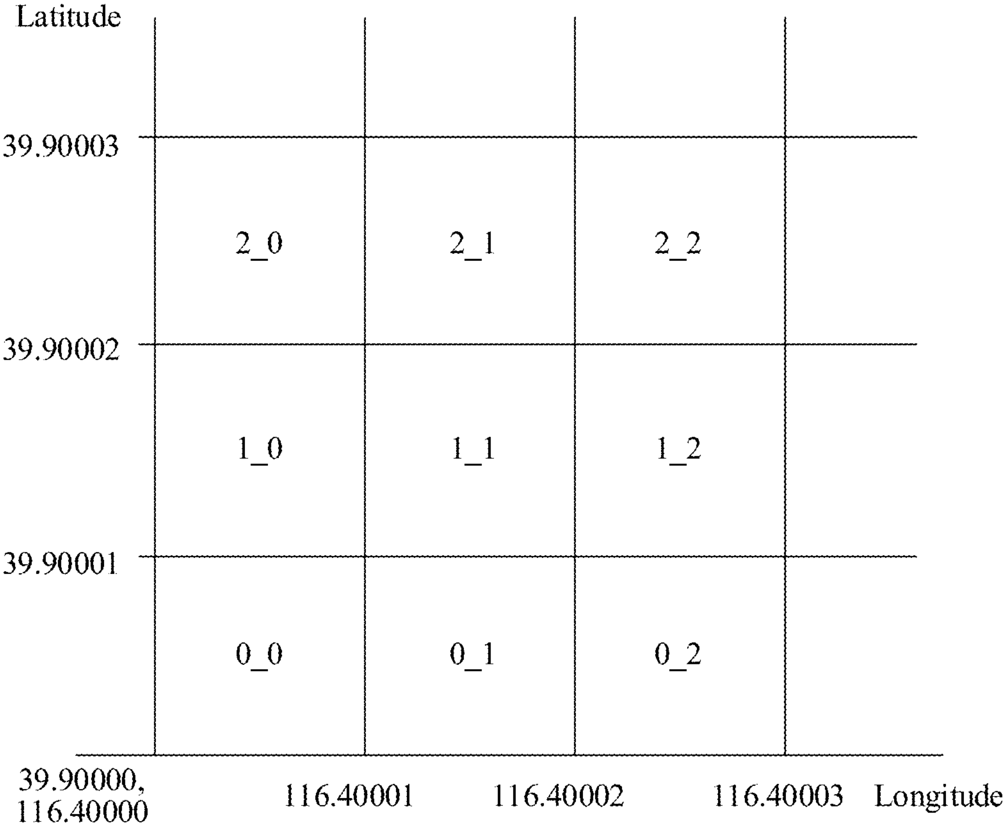
FIG. 3 is a schematic diagram of distribution of geographic grids according to an embodiment.

The preset geographic-grid set mentioned in the foregoing example may be understood as a set of a plurality of geographic grids. For example, the server divides a ground surface into a plurality of geographic grids in advance. Geographic ranges obtained through division by the geographic grids may be the same or different. This is not specifically limited. For example, the server divides the ground surface into geographic grids with a preset length×a preset width based on a longitude and a latitude of each geographic location on the ground surface. For example, the preset length and the preset width are both 1 km, and five digits after decimal points of the longitude and the latitude are taken as a boundary of the geographic grid. FIG. 3 is a schematic diagram of distribution of geographic grids according to an embodiment. A grid size of a geographic grid in FIG. 3 is 1 km×1 km. To be specific, latitudes are sequentially 39.90000 km, 39.90001 km, 39.90002 km, and 39.90003 km, and longitudes are sequentially 116.40000 km, 116.40001 km, 116.40002 km, and 116.40003 km. There are a total of 9 geographic grids, namely, a grid 1_1, a grid 2_1, a grid 0_1, a grid 1_0, a grid 1_2, a grid 2_0, a grid 0_0, a grid 2_2, and a grid 0_2.

Operation 206: Calculate a relative location error degree between the target vehicle and each candidate vehicle based on the floating vehicle data and the candidate vehicle sensing data that are at the current frame moment.

The relative location error degree represents a proximity degree between the target vehicle and the candidate vehicle. For each candidate vehicle, a smaller relative location error degree between the candidate vehicle and the target vehicle indicates that the candidate vehicle is closer to the target vehicle. The relative location error degree may be determined in at least one calculation manner of speed calculation, distance calculation, trajectory comparison, and azimuth calculation. It is clear that the relative location error degree may alternatively be determined through other calculation, for example, through acceleration calculation.

In some embodiments, the server obtains, for each candidate vehicle, the candidate vehicle sensing data of the candidate vehicle and the floating vehicle data of the target vehicle that are at the current frame moment. The server calculates the relative location error degree between the candidate vehicle and the target vehicle through at least one of the speed calculation, the distance calculation, the trajectory comparison, or the azimuth calculation based on the candidate vehicle sensing data of the candidate vehicle and the floating vehicle data that are at the current frame moment.

For example, the relative location error degree may be determined through the distance calculation. For example, the relative location error degree is determined based on a distance between the target vehicle and the candidate vehicle. Alternatively, the relative location error degree may be determined through the speed calculation. For example, the relative location error degree is determined based on a difference between a speed of the target vehicle and a speed of the candidate vehicle. Alternatively, the relative location error degree may be determined by comparing a trajectory of the target vehicle and a trajectory of the candidate vehicle. Alternatively, the relative location error degree may be determined based on a difference between an azimuth of the target vehicle and an azimuth of the candidate vehicle.

To ensure accuracy of the relative location error degree between the target vehicle and each candidate vehicle, for the floating vehicle data or the candidate vehicle sensing data, the floating vehicle data and the candidate vehicle sensing data may be determined based on vehicle feature data in different dimensions. For example, the floating vehicle data and the candidate vehicle sensing data may be determined based on vehicle feature data in at least two of a distance dimension, a direction dimension, a speed dimension, and a trajectory dimension. Vehicle data in a dimension is considered as vehicle feature data in the dimension. The distance dimension, the direction dimension, the speed dimension, and the trajectory dimension respectively correspond to the distance calculation, the azimuth calculation, the speed calculation, and the trajectory comparison described above. In this way, for each candidate vehicle, a difference between target vehicle feature data of the target vehicle and candidate vehicle feature data of the candidate vehicle in a same dimension is calculated, and differences respectively corresponding to at least two dimensions are combined, to obtain the relative location error degree between the target vehicle and the candidate vehicle.

For example, for each dimension and each candidate vehicle, the server obtains target vehicle feature data of the target vehicle and candidate vehicle feature data of the candidate vehicle in the dimension respectively. Therefore, for each dimension and each candidate vehicle, the server calculates a difference between the target vehicle feature data of the target vehicle and the candidate vehicle feature data of the candidate vehicle in the dimension, and determines the difference as a dimension error degree corresponding to the dimension. Therefore, the server determines the relative location error degree between the target vehicle and each candidate vehicle by combining dimension error degrees respectively corresponding to a plurality of dimensions. The dimension error degree represents an error degree in a dimension. For example, for the distance dimension, a corresponding candidate vehicle feature data is a geographic location of the candidate vehicle, and a corresponding target vehicle feature data is the geographic location of the target vehicle. A corresponding dimension error degree is obtained by calculating the distance between the target vehicle and the candidate vehicle based on the geographic location of the candidate vehicle and the geographic location of the target vehicle. Calculation of dimension error degrees respectively corresponding to the direction dimension, the speed dimension, and the trajectory dimension is similar to the operations of calculating the dimension error degree corresponding to the distance dimension.

Operation 208: Calculate a matching confidence that is between the target vehicle and each candidate vehicle and that is at the current frame moment based on the relative location error degree that is between the target vehicle and each candidate vehicle and that is at the current frame moment.

The matching confidence represents credibility of the relative location error degree between the target vehicle and the candidate vehicle. In other words, for each candidate vehicle, a higher matching confidence between the candidate vehicle and the target vehicle indicates higher credibility of the relative location error degree between the candidate vehicle and the target vehicle. A value range of the matching confidence is greater than 0 and less than or equal to 1.

In some embodiments, for each candidate vehicle, the server obtains the relative location error degree that is between the target vehicle and the candidate vehicle and that is at the current frame moment, and directly determines the relative location error degree that is between the target vehicle and the candidate vehicle and that is at the current frame moment as the matching confidence that is between the target vehicle and each candidate vehicle and that is at the current frame moment.

For example, in a case that one candidate vehicle exists in the candidate geographic region at the current frame moment, the server determines a matching confidence that is between the target vehicle and the existing candidate vehicle and that is at the current frame moment based on a relative location error degree that is between the target vehicle and the existing candidate vehicle and that is at the current frame moment.

For each candidate vehicle, the matching confidence between the candidate vehicle and the target vehicle is negatively correlated with the relative location error degree. To be specific, a greater matching confidence between the candidate vehicle and the target vehicle indicates a smaller relative location error degree between the candidate vehicle and the target vehicle.

In a case that at least two candidate vehicles exist in the candidate geographic region at the current frame moment, for each candidate vehicle, the server uses a vehicle other than the candidate vehicle in the candidate geographic region as a reference vehicle. The server calculates a matching confidence that is between the target vehicle and the candidate vehicle existing in the candidate geographic region and that is at the current frame moment based on a relative location error degree that is between the target vehicle and the candidate vehicle and that is at the current frame moment and a relative location error degree between the target vehicle and each reference vehicle.

In the case that one candidate vehicle exists in the candidate geographic region at the current frame moment, it indicates that a traffic condition in the candidate geographic region at the current frame moment is a scenario in which vehicles are sparse, for example, a highway with a large area but sparse vehicles. In the case that at least two candidate vehicles exist in the candidate geographic region at the current frame moment, it indicates that a traffic condition in the candidate geographic region at the current frame moment is a scenario in which vehicles are dense. In this case, when there are more candidate vehicles, it indicates that the traffic condition in the scenario is more complex, for example, an intersection with heavy traffic. Therefore, for each candidate vehicle, the matching confidence between the target vehicle and the candidate vehicle is considered based on a scenario of an actual traffic condition.

Operation 210: Select, from the at least one candidate vehicle, a candidate vehicle whose relative location error degree with the target vehicle satisfies an error-degree threshold condition and whose matching confidence with the target vehicle satisfies a confidence threshold condition.

The error-degree threshold condition is that the relative location error degree is not greater than a preset error threshold, and the confidence threshold condition is that the matching confidence is not less than the preset confidence threshold.

In some embodiments, for each candidate vehicle, the server verifies whether the relative location error degree between the candidate vehicle and the target vehicle satisfies the error-degree threshold condition, to obtain an error-degree verification result corresponding to the candidate vehicle. For each candidate vehicle, the server verifies whether the matching confidence between the candidate vehicle and the target vehicle satisfies the confidence threshold condition, to obtain a confidence verification result corresponding to the candidate vehicle. The server selects, from the at least one candidate vehicle based on the error-degree verification result and the confidence verification result respectively corresponding to each candidate vehicle, a corresponding candidate vehicle whose error-degree verification result and confidence verification result both pass. That the error-degree verification result passes represents that the relative location error degree between the candidate vehicle and the target vehicle satisfies the error-degree threshold condition. That the confidence verification result passes represents that the matching confidence between the candidate vehicle and the target vehicle satisfies the confidence threshold condition.

That the error-degree verification result does not pass represents that the relative location error degree between the candidate vehicle and the target vehicle is less than the preset error threshold. That the confidence verification result does not pass represents that the matching confidence between the candidate vehicle and the target vehicle is less than the preset confidence threshold.

For example, the server compares the relative location error degree between each candidate vehicle and the target vehicle with the preset error threshold, to obtain the error-degree verification result respectively corresponding to each candidate vehicle. When the server determines that an error-degree verification result corresponding to at least one candidate vehicle represents that a relative location error degree between the candidate vehicle and the target vehicle is not greater than the preset error threshold, the relative location error degree between the at least one candidate vehicle and the target vehicle satisfies the error-degree threshold condition. The server uses each of the at least one candidate vehicle as a to-be-selected vehicle.

The server respectively compares the preset confidence threshold with a matching confidence between each to-be-selected vehicle and the target vehicle, to obtain a confidence verification result respectively corresponding to each to-be-selected vehicle. When a confidence verification result corresponding to one to-be-selected vehicle represents that a matching confidence between the to-be-selected vehicle and the target vehicle is not less than the preset confidence threshold, that is, the matching confidence between the to-be-selected vehicle and the target vehicle satisfies the confidence threshold condition, the server uses, as the selected candidate vehicle, the corresponding to-be-selected vehicle satisfying the confidence threshold condition.

Operation 212: Use the selected candidate vehicle as a candidate vehicle successfully matching the target vehicle at the current frame moment. The candidate vehicle successfully matching the target vehicle is also referred to as a "matching candidate vehicle."

In some embodiments, in a case that the server detects, through verification, a candidate vehicle whose relative location error degree with the target vehicle satisfies the error-degree threshold condition and whose matching confidence with the target vehicle satisfies the confidence threshold condition, the server uses the candidate vehicle as the candidate vehicle successfully matching the target vehicle.

Only when a relative location error degree between a candidate vehicle and the target vehicle satisfies the error-degree threshold condition and a matching confidence between the candidate vehicle and the target vehicle satisfies the confidence threshold condition, it can be determined that the candidate vehicle successfully matching the target vehicle exists in the candidate geographic region at the current frame moment. In this case, the server uses the candidate vehicle successfully matching the target vehicle as a host vehicle. In this case, vehicle matching is successful, to be specific, a primary vehicle is successfully matched. For example, there is a candidate vehicle A, a candidate vehicle B, and a candidate vehicle C in the candidate geographic region, but the server does not know which candidate vehicle is the target vehicle. Therefore, when it is determined, according to operation 206 to operation 208, that the candidate vehicle B successfully matches the target vehicle, the server may determine that the candidate vehicle B in the candidate geographic region is the target vehicle.

Because costs of a mistake in vehicle matching is much greater than costs of a matching failure, an evaluation value needs to be established based on the matching confidence, that is, the credibility of the relative location error degree is evaluated based on the matching confidence. In this way, a balance between a matching failure and a matching mistake is achieved based on two aspects, namely, the relative location error degree and the matching confidence, to effectively avoid the matching mistake. To be specific, in a case that whether there is a matching mistake is not determined, it is preferable to choose the matching failure instead of the matching mistake.

After determining the host vehicle that is at the current frame moment, the server may distinguish a primary vehicle from a surrounding vehicle based on the host vehicle that is at the current frame moment. To be specific, the host vehicle that is at the current frame moment is used as the primary vehicle that is at the current frame moment, and a vehicle surrounding the primary vehicle that is at the current frame moment is used as the surrounding vehicle that is at the current frame moment.

Figure 4:
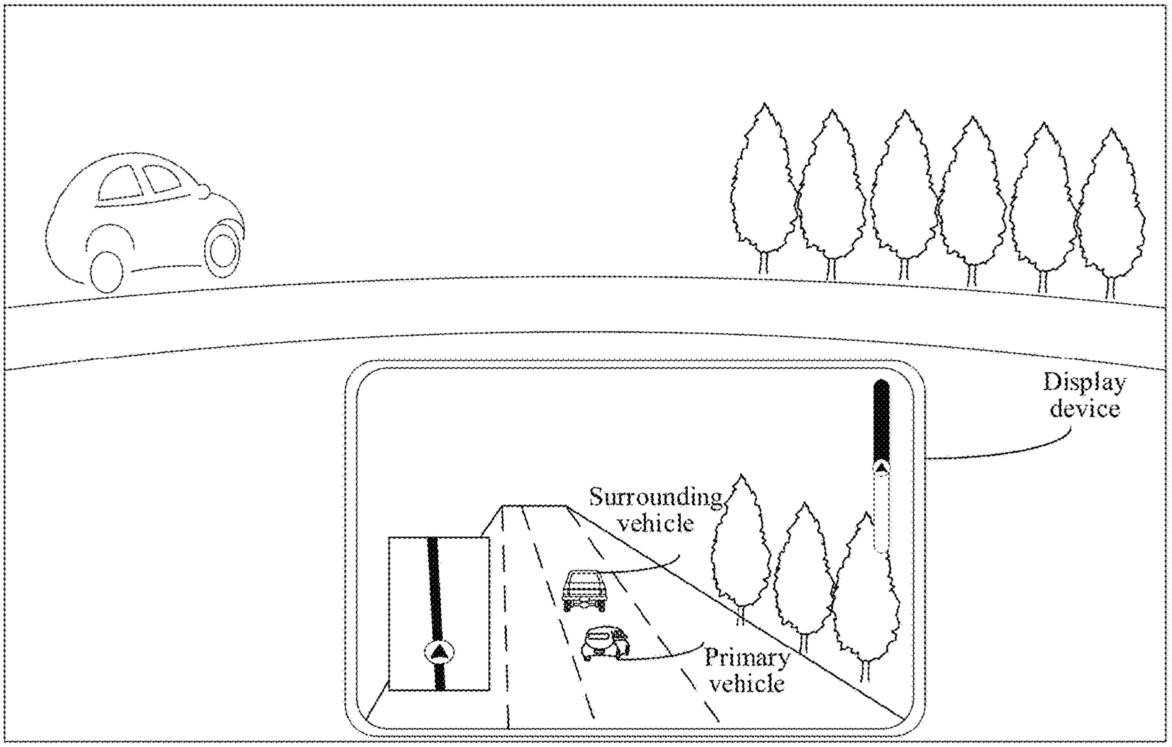
FIG. 4 is a schematic diagram of cooperative vehicle warning according to an embodiment.

Further, the server performs vehicle-infrastructure cooperation warning based on the primary vehicle and the surrounding vehicle that are at the current frame moment. FIG. 4 is a schematic diagram of cooperative vehicle warning according to an embodiment. A server sends respective locations that are of a primary vehicle and a surrounding vehicle and that are at a current frame moment to a display device of a target vehicle for display. The location that is of the primary vehicle and that is at the current frame moment in the display device is a location of the target vehicle. If a distance that is between the surrounding vehicle and the primary vehicle and that is at the current frame moment exceeds a warning distance, the server sends warning information to the display device of the target vehicle. For example, there are two consecutive vehicles on a highway at the current frame moment. If the primary vehicle is ahead and the surrounding vehicle is behind (that is, the surrounding vehicle is a rear vehicle), the server detects, through verification, that the distance that is between the surrounding vehicle and the primary vehicle and that is at the current frame moment exceeds the warning distance, the server sends the warning information. The warning information is configured for prompting a user in the target vehicle to notice that the rear vehicle overtakes at the current frame moment. Similarly, if the primary vehicle is behind and the surrounding vehicle is ahead (that is, the surrounding vehicle is a front vehicle), the server detects, through verification, that the distance that is between the surrounding vehicle and the primary vehicle and that is at the current frame moment exceeds the warning distance, the server sends the warning information. The warning information is configured for prompting a user in the target vehicle to pay attention to avoiding collision with the front vehicle at the current frame moment.

Figure 5:
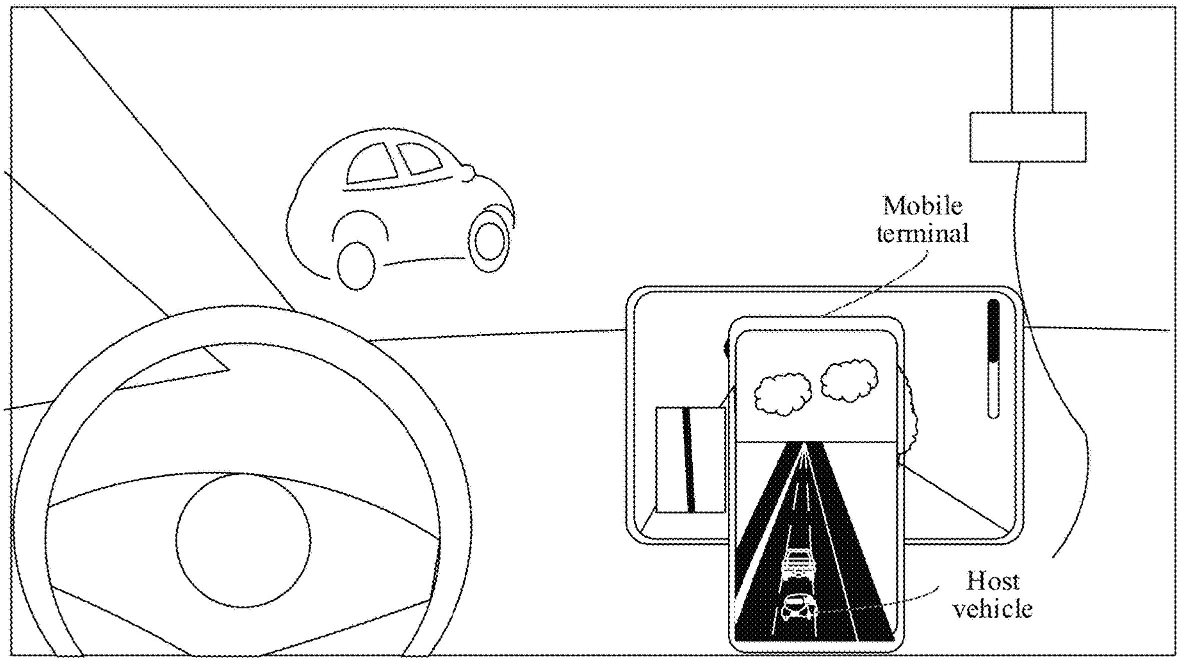
FIG. 5 is a schematic diagram of twin application of vehicle-infrastructure cooperation according to an embodiment.

Further, the server performs twin application of vehicle-infrastructure cooperation based on the primary vehicle and the surrounding vehicle that are at the current frame moment. FIG. 5 is a schematic diagram of twin application of vehicle-infrastructure cooperation according to an embodiment. A server sends a location at which a host vehicle is located at a current frame moment to a mobile terminal held by a user in a target vehicle. The mobile terminal displays whether there is a vehicle around the host vehicle. For example, there are two consecutive vehicles on a highway at the current frame moment. If the host vehicle is ahead, the mobile terminal displays that there is a vehicle behind this vehicle (the host vehicle). If the host vehicle is behind, the mobile terminal displays that there is a vehicle in front of this vehicle (the host vehicle).

In other words, after the candidate vehicle successfully matching the target vehicle is determined at the current frame moment, collaborative warning and twin application of the vehicle matching the host vehicle may be performed based on the successfully matching candidate vehicle.

According to the foregoing vehicle matching method, the floating vehicle data of the target vehicle is obtained, where the floating vehicle data is collected frame by frame by the positioning device in the target vehicle, and the floating vehicle data includes the geographic location of the target vehicle, so that the floating vehicle data respectively corresponding to each frame moment can be determined in real time. Therefore, the candidate geographic region covering the geographic location that is at the current frame moment can be effectively and accurately determined based on the geographic location. In this way, a vehicle in the candidate geographic region is directly determined as the candidate vehicle to be matched with the target vehicle. In addition, the sensing device deployed in the candidate geographic region collects the candidate vehicle sensing data of the at least one candidate vehicle in the candidate geographic region. The relative location error degree between the target vehicle and each candidate vehicle is calculated based on the floating vehicle data and that candidate vehicle sensing data that are at the current frame moment. In other words, a proximity degree between each candidate vehicle and the target vehicle can be intuitively reflected based on the relative location error degree between the target vehicle and each candidate vehicle. Further, to correct a matching error caused by the relative location error degree, credibility of each relative location error degree is considered. In other words, the matching confidence that is between the target vehicle and each candidate vehicle and that is at the current frame moment is calculated based on the relative location error degree that is between the target vehicle and each candidate vehicle and that is at the current frame moment. In other words, the credibility of each relative location error degree is further evaluated based on the matching confidence. In this way, the candidate vehicle whose relative location error degree with the target vehicle satisfies the error-degree threshold condition and whose matching confidence with the target vehicle satisfies the confidence threshold condition can be accurately selected from the at least one candidate vehicle. In this way, the selected candidate vehicle can be directly determined as the candidate vehicle successfully matching the target vehicle. In other words, the location of the target vehicle is optimally estimated based on the relative location error degree that can accurately reflect the proximity degree between each candidate vehicle and the target vehicle and the matching confidence that can be configured for accurately evaluating the credibility of the relative location error degree, to accurately match a vehicle, in other words, improve vehicle matching accuracy.

As described above, the candidate vehicle sensing data of the candidate vehicle is obtained by using the preset geographic-grid set. Therefore, before obtaining the candidate vehicle sensing data of the candidate vehicle, the server needs to store, in a storage unit corresponding to a geographic grid to which the sensing device belongs in the geographic-grid set, the candidate vehicle sensing data uploaded by the sensing device. Therefore, in some embodiments, an operation of storing the candidate vehicle sensing data in each geographic grid includes: After obtaining the candidate vehicle sensing data that is of the candidate vehicle and that is respectively sent by each sensing device deployed in a preset region, for the sensing device in each geographic grid, the server stores, in a storage unit corresponding to the geographic grid, the candidate vehicle sensing data collected by the sensing device in the geographic grid. One sensing device is deployed in each geographic grid, and each geographic grid corresponds to one storage unit. The storage unit is configured to store the candidate vehicle sensing data in the corresponding geographic grid.

Based on this, the candidate vehicle sensing data collected by the sensing device in the geographic grid is stored in real time by using the storage unit corresponding to the geographic grid, so that it is ensured that the candidate vehicle sensing data in any candidate geographic region can be obtained in real time in a timely manner based on an actual requirement subsequently, that is, efficiency of obtaining the candidate vehicle sensing data is improved.

In some embodiments, the determining, based on a geographic location that is at a current frame moment, a candidate geographic region covering the geographic location, and obtaining candidate vehicle sensing data of at least one candidate vehicle in the candidate geographic region includes: determining, from the preset geographic-grid set, the target geographic grid in which the geographic location that is at the current frame moment is located, where the geographic-grid set includes a plurality of geographic grids, and the sensing device is respectively deployed in each geographic grid; determining, based on at least the target geographic grid, the candidate geographic region covering the target geographic grid; and obtaining, for each geographic grid in the candidate geographic region, the candidate vehicle sensing data of the at least one candidate vehicle that is collected by the sensing device in the geographic grid.

As described above, the geographic-grid set includes the plurality of geographic grids, one sensing device is deployed in each geographic grid, and each geographic grid corresponds to one storage unit.

In some embodiments, the server obtains the preset geographic-grid set, determines, from the plurality of geographic grids in the geographic-grid set, the geographic grid in which the geographic location that is at the current frame moment is located, and uses the located geographic grid as the target geographic grid. The server directly uses the target geographic grid as the candidate geographic region. The server obtains candidate vehicle sensing data of the at least one candidate vehicle that is collected by a sensing device in the target geographic grid.

In some embodiments, after determining the target geographic grid, the server determines, based on the target geographic grid and at least one neighboring geographic grid adjacent to the target geographic grid, the candidate geographic region covering the target geographic grid. The server obtains the candidate vehicle sensing data that is of the at least one candidate vehicle and that is counted in the geographic grid covered by the candidate geographic region. The server obtains, for each geographic grid in the candidate geographic region, the candidate vehicle sensing data of the at least one candidate vehicle that is collected by the sensing device in the geographic grid.

For example, the server obtains the preset geographic-grid set, determines, from the plurality of geographic grids in the geographic-grid set, the geographic grid in which the geographic location that is at the current frame moment is located, and uses the located geographic grid as the target geographic grid. The server determines the at least one neighboring geographic grid adjacent to the target geographic grid, and combines the at least one neighboring geographic grid and the target geographic grid, to obtain the candidate geographic region covering the target geographic grid. The server obtains the candidate vehicle sensing data that is of the at least one candidate vehicle and that is respectively counted in each geographic grid in the candidate geographic region.

In this embodiment, the target geographic grid in which the geographic location that is at the current frame moment is located is accurately located from the preset geographic-grid set. In this way, the candidate geographic region can be accurately obtained through division based on the target geographic grid, so that the at least one candidate vehicle that performs vehicle matching with the target vehicle can be queried. The candidate vehicle sensing data of the at least one candidate vehicle that is collected by the sensing device in the geographic grid is obtained for each geographic grid in the candidate geographic region. In this way, candidate vehicle sensing data that is not in the candidate geographic region does not need to be collected, so that collection difficulty is reduced, and a calculation amount of data counting is also effectively reduced.

Because the geographic location that is at the current frame moment may be at an edge of the target geographic grid, the candidate vehicle matching the target vehicle may be in the neighboring geographic grid adjacent to the target geographic grid.

Therefore, to avoid missing of the candidate vehicle sensing data of the candidate vehicle, and ensure effectiveness of matching the candidate vehicle, the following operation is performed. In some embodiments, the determining, based on at least the target geographic grid, the candidate geographic region covering the target geographic grid includes: determining, based on a preset manner of determining an adjacent geographic grid (i.e., a preset adjacent geographic grid determination manner), the at least one neighboring geographic grid adjacent to the target geographic grid; and determining, based on the target geographic grid and the at least one neighboring geographic grid, the candidate geographic region covering the target geographic grid.

The preset manner of determining an adjacent geographic grid is a manner for determining a neighboring geographic grid adjacent to the target geographic grid. The preset manner of determining an adjacent geographic grid may be a four-neighborhood determining manner, an eight-neighborhood determining manner, or a determining manner of a specific direction. For example, FIG. 3 is used as an example for description. The target geographic grid is the grid 1_1 in FIG. 3. In the four-neighborhood determining manner, the target geographic grid is used as a center, and grids that are adjacent to the target geographic grid and that are respectively located in four directions, namely, an up direction, a low direction, a left direction, and a right direction, of the target geographic grid are used as neighboring geographic grids. For example, the grid 2_1, the grid 0_1, the grid 1_0, and the grid 1_2 are respectively used as the neighboring geographic grids. In the eight-neighborhood determining manner, the target geographic grid is used as a center, and grids that are adjacent to the target geographic grid and that are respectively located in eight directions, namely, an up direction, a low direction, a left direction, a right direction, an upper left direction, a lower left direction, an upper right direction, and a lower right direction, of the target geographic grid are used as neighboring geographic grids. For example, the grid 2_1, the grid 0_1, the grid 1_0, the grid 1_2, the grid 2_0, the grid 0_0, the grid 2_2, and the grid 0_2 in FIG. 3 are respectively used as the neighboring geographic grids. In the determining manner of a specific direction, the target geographic grid is used as a center, and a grid that is adjacent to the target geographic grid and that is located in at least one of eight directions, namely, an up direction, a low direction, a left direction, a right direction, an upper left direction, a lower left direction, an upper right direction, and a lower right direction, of the target geographic grid is used as a neighboring geographic grid.

In some embodiments, the server selects, based on the preset manner of determining an adjacent geographic grid, the at least one neighboring geographic grid adjacent to the target geographic grid. The server splices the target geographic grid and the at least one neighboring geographic grid, to obtain a spliced region, and uses the spliced region as the candidate geographic region. The candidate geographic region covers the target geographic grid and the at least one neighboring geographic grid.

For example, the server uses, in the eight-neighborhood determining manner, the grids that are adjacent to the target geographic grid and that are respectively located in the eight directions, namely, the up direction, the low direction, the left direction, the right direction, the upper left direction, the lower left direction, the upper right direction, and the lower right direction, of the target geographic grid as the neighboring geographic grids of the target geographic grid. The server sequentially splices the target geographic grid and the eight neighboring geographic grids, to obtain a spliced region, and uses the spliced region as the candidate geographic region. In this case, the candidate geographic region includes the target geographic grid and the eight neighboring geographic grids.

In this embodiment, the at least one neighboring geographic grid adjacent to the target geographic grid is determined based on the preset manner of determining an adjacent geographic grid. Therefore, the spliced region is obtained by splicing the at least one neighboring geographic grid and the target geographic grid, to use the spliced region as the candidate geographic region. In this way, the candidate geographic region covers the target geographic grid in which the target vehicle is located, and missing of the candidate vehicle is effectively avoided. Therefore, complete and detailed candidate vehicle sensing data can be obtained, and accuracy and effectiveness of subsequent vehicle matching is ensured.

As described above, after the candidate vehicle sensing data of the at least one candidate vehicle in the candidate geographic region is obtained, to save computing power, whether a sensed vehicle is in a vehicle-following mode at a previous frame moment can be verified in advance.

Therefore, in some embodiments, the method further includes: in a case that it is determined, based on candidate vehicle sensing data that is at the previous frame moment, that the candidate vehicle in the candidate geographic region is not in the vehicle-following mode at the previous frame moment, performing the operation of calculating a relative location error degree between the target vehicle and each candidate vehicle based on the floating vehicle data and the candidate vehicle sensing data that are at the current frame moment. The vehicle-following mode is configured for representing that a vehicle successfully matches the corresponding candidate vehicle at the previous frame moment, a relative location error degree between the corresponding candidate vehicle and the successfully matching vehicle satisfies a preset error-degree threshold condition of the vehicle-following mode at the previous frame moment, and a matching confidence between the corresponding candidate vehicle and the successfully matching vehicle satisfies a preset confidence threshold condition of the vehicle-following mode at the previous frame moment.

The preset error-degree threshold condition of the vehicle-following mode is being not greater than a preset error-degree threshold of the vehicle-following mode, and the preset confidence threshold condition of the vehicle-following mode is being not less than a preset confidence threshold of the vehicle-following mode. The error-degree threshold of the vehicle-following mode may be less than or equal to the foregoing described error-degree threshold, and the confidence threshold of the vehicle-following mode may be less than or equal to the foregoing described confidence threshold.

In some embodiments, after determining the at least one candidate vehicle that is in the candidate geographic region and that is at the current frame moment, the server obtains candidate vehicle sensing data that is of the at least one candidate vehicle and that is at the previous frame moment. For each candidate vehicle, the server determines, based on candidate vehicle sensing data that is of the candidate vehicle and that is at the previous frame moment, whether the candidate vehicle is in the vehicle-following mode at the previous frame moment. When it is detected, through verification, that no candidate vehicle is in the vehicle-following mode at the previous frame moment, the server performs the operation of calculating a relative location error degree between the target vehicle and each candidate vehicle based on the floating vehicle data and the candidate vehicle sensing data that are at the current frame moment.

For example, the server determines that a candidate vehicle A and a candidate vehicle B exist in the candidate geographic region at the current frame moment. The server obtains candidate vehicle sensing data a that is of the candidate vehicle A and that is at the previous frame moment, and obtains candidate vehicle sensing data b that is of the candidate vehicle B and that is at the previous frame moment. When the server determines, based on the candidate vehicle sensing data a that is at the previous frame moment, that the candidate vehicle A is not in the vehicle-following mode at the previous frame moment, and the server determines, based on the candidate vehicle sensing data b that is at the previous frame moment, that the candidate vehicle B is not in the vehicle-following mode at the previous frame moment, the server performs the operation of calculating a relative location error degree between the target vehicle and each candidate vehicle based on the floating vehicle data and the candidate vehicle sensing data that are at the current frame moment.

In this embodiment, after the candidate vehicle sensing data of the at least one candidate vehicle in the candidate geographic region is determined, whether a candidate vehicle in the candidate geographic region is in the vehicle-following mode at the previous frame moment is verified in real time based on the candidate vehicle sensing data that is at the previous frame moment. Once it is determined that no candidate vehicle in the candidate geographic region is in the vehicle-following mode at the previous frame moment, the operation of calculating a relative location error degree between the target vehicle and each candidate vehicle based on the floating vehicle data and the candidate vehicle sensing data that are at the current frame moment is directly performed. Therefore, subsequent vehicle matching at the current frame moment can be performed in time.

To quickly and accurately detect whether a candidate vehicle in the candidate geographic region is in the vehicle-following mode at the previous frame moment, in some embodiments, the method further includes: traversing candidate vehicle sensing data that is of the at least one candidate vehicle and that is at the previous frame moment, and reading an identifier of the vehicle-following mode from the traversed candidate vehicle sensing data; and in a case that the identifier of the vehicle-following mode is not read after the traversing ends, determining that the candidate vehicle in the candidate geographic region is not in the vehicle-following mode at the previous frame moment.

The identifier of the vehicle-following mode is configured for identifying whether the candidate vehicle is in the vehicle-following mode. The identifier of the vehicle-following mode may be represented by an identity document (ID). This is not specifically limited. When it is determined that the candidate vehicle is in the vehicle-following mode at the previous frame moment, the corresponding identifier of the vehicle-following mode is added to the candidate vehicle sensing data. Similarly, when it is determined that the candidate vehicle is not in the vehicle-following mode at the previous frame moment, the corresponding identifier of the vehicle-following mode is not added to the candidate vehicle sensing data.

In some embodiments, the server obtains the candidate vehicle sensing data that is of the at least one candidate vehicle and that is at the previous frame moment, and traverses the candidate vehicle sensing data that is of the at least one candidate vehicle and that is at the previous frame moment to determine whether there is the identifier of the vehicle-following mode. After the traversing ends, if it is detected, through querying, that the identifier of the vehicle-following mode is not read from the candidate vehicle sensing data of any candidate vehicle, the server determines that the candidate vehicle in the candidate geographic region is not in the vehicle-following mode at the previous frame moment. After the traversing ends, if the identifier of the vehicle-following mode is read from candidate vehicle sensing data of one candidate vehicle, the server determines that the candidate vehicle from which the identifier of the vehicle-following mode is read in the candidate geographic region is in the vehicle-following mode.

For example, when one candidate vehicle exists in the candidate geographic region at the current frame moment, the server obtains candidate vehicle sensing data that is of the candidate vehicle and that is at the previous frame moment. In a case that the server queries no identifier of the vehicle-following mode in the candidate vehicle sensing data that is of the candidate vehicle and that is at the previous frame moment, the server determines that no candidate vehicle is in the vehicle-following mode at the previous frame moment. In a case that the server queries the identifier of the vehicle-following mode in the candidate vehicle sensing data that is of the candidate vehicle and that is at the previous frame moment, the server determines that the candidate vehicle is in the vehicle-following mode at the previous frame moment.

In a case that at least two candidate vehicles exist in the candidate geographic region at the current frame moment, the server obtains candidate vehicle sensing data that is of each candidate vehicle and that is at the previous frame moment. The server detects, through querying, whether the identifier of the vehicle-following mode exists in the candidate vehicle sensing data that is of each candidate vehicle and that is at the previous frame moment. After the candidate vehicle sensing data that is of all the candidate vehicles and that is at the previous frame moment is traversed, if the identifier of the vehicle-following mode is not queried in candidate vehicle sensing data that is of any candidate vehicle and that is at the previous frame moment, the server determines that no candidate vehicle is in the vehicle-following mode at the previous frame moment. After the candidate vehicle sensing data that is of all the candidate vehicles and that is at the previous frame moment is traversed, if the identifier of the vehicle-following mode is queried in candidate vehicle sensing data that is of at least two candidate vehicles and that is at the previous frame moment, the server determines that there is an error in querying of the identifier of the vehicle-following mode, and determines that the identifier of the vehicle-following mode does not exist in the candidate vehicle sensing data that is of all the candidate vehicles and that is at the previous frame moment After the candidate vehicle sensing data that is of all the candidate vehicles and that is at the previous frame moment is queried, if it is detected, through querying, that the identifier of the vehicle-following mode exists in candidate vehicle sensing data that is of one candidate vehicle and that is at the previous frame moment, the server determines that the candidate vehicle from which the identifier of the vehicle-following mode is read is in the vehicle-following mode.

In this embodiment, the candidate vehicle sensing data that is of the at least one candidate vehicle and that is at the previous frame moment is traversed to determine whether there is the identifier of the vehicle-following mode, so that whether the at least one candidate vehicle is in the vehicle-following mode at the previous frame moment can be quickly and accurately detected, and efficiency of detecting the vehicle-following mode at the previous frame moment is improved.

For each candidate vehicle in the candidate geographic region at the current frame moment, after it is determined that one candidate vehicle is in the vehicle-following mode at the previous frame moment, whether the candidate vehicle that is in the vehicle-following mode at the previous frame moment is still in the vehicle-following mode at the current frame moment needs to be further verified.

Therefore, in some embodiments, the method further includes: in a case that it is determined, based on the candidate vehicle sensing data that is at the previous frame moment, that a candidate vehicle in the candidate vehicle in the candidate geographic region is in the vehicle-following mode at the previous frame moment, determining a physical distance between the candidate vehicle in the vehicle-following mode and the target vehicle based on the floating vehicle data and candidate vehicle sensing data of the candidate vehicle in the vehicle-following mode that are at the current frame moment; and in a case that the physical distance is not greater than a preset distance threshold, determining that the candidate vehicle in the vehicle-following mode successfully matches the target vehicle, and causing the candidate vehicle in the vehicle-following mode to remain in the vehicle-following mode at the current frame moment.

As described above, the floating vehicle data includes the geographic location of the target vehicle, and the candidate vehicle sensing data includes the geographic location of the candidate vehicle. The geographic location includes a longitude and a latitude. The physical distance refers to a distance between two vehicles.

In some embodiments, in a case that the server determines, based on the candidate vehicle sensing data that is at the previous frame moment, that a candidate vehicle in the candidate vehicle in the candidate geographic region is in the vehicle-following mode at the previous frame moment, the server uses the candidate vehicle that is in the vehicle-following mode at the previous frame moment as a to-be-verified candidate vehicle. The server obtains the candidate vehicle sensing data of the to-be-verified candidate vehicle and the floating vehicle data of the target vehicle that are at the current frame moment, determines a geographic location that is of the to-be-verified candidate vehicle and that is at the current frame moment based on the candidate vehicle sensing data that is of the to-be-verified candidate vehicle and that is at the current frame moment, and determines the geographic location that is of the target vehicle and that is at the current frame moment based on the floating vehicle data that is of the target vehicle and that is at the current frame moment. The server calculates the physical distance that is between the to-be-verified candidate vehicle and the target vehicle and that is at the current frame moment based on the geographic location of the to-be-verified candidate vehicle and the geographic location of the target vehicle that are at the current frame moment. When the physical distance is not greater than the preset distance threshold, the server determines that the to-be-verified candidate vehicle continues to be in the vehicle-following mode at the current frame moment, and directly uses the to-be-verified candidate vehicle as the candidate vehicle successfully matching the target vehicle at the current frame moment.

Therefore, after it is determined that the to-be-verified candidate vehicle successfully matches the target vehicle at the current frame moment, the relative location error degree and the matching confidence between the at least one candidate vehicle and the target vehicle at the current frame moment does not need to be further determined. In this way, when a calculation amount is reduced, reliability of a vehicle matching result at the current frame moment is ensured. In other words, once matching quality at a frame moment is high enough, a candidate vehicle successfully matched at the frame moment may continue to be affirmed at a subsequent frame moment, and no repeated matching is required. When a traffic condition corresponding to the frame moment is simpler, a candidate vehicle with high matching quality is casier to be obtained. In other words, the candidate vehicle with high matching quality more easily remains in the vehicle-following mode at the subsequent frame moment. Therefore, once the candidate vehicle with high matching quality is determined in a scenario of a simple traffic condition, even if a scenario at the subsequent frame moment is a scenario of a complex traffic condition, whether a physical distance between the candidate vehicle with high matching quality and the target vehicle in the scenario of the complex traffic condition is less than the preset distance threshold is first verified. If so, vehicle matching does not need to be performed in the scenario of the complex traffic condition.

For example, the server determines that the candidate vehicle that is in the vehicle-following mode at the previous frame moment is a to-be-verified candidate vehicle C. The server determines a geographic location $(x_f, y_f)$ of the to-be-verified candidate vehicle C and the geographic location $(x_e, y_e)$ of the target vehicle that are at the current frame moment. $x_f$ and $y_f$ respectively represents a longitude and a latitude of the to-be-verified candidate vehicle C, and $x_e$ and $y_e$ respectively represents a longitude and a latitude of the target vehicle. The server calculates a straight-line distance between the geographic location $(x_f, y_f)$ of the to-be-verified candidate vehicle C and the geographic location $(x_e, y_e)$ of the target vehicle, to obtain a physical distance $d_{track}$ that is at the current frame moment, and determines, based on the following formula, whether the to-be-verified candidate vehicle continues to be in the vehicle-following mode at the current frame moment:

$$d_{track} \leq D_{track}$$

$D_{track}$ represents the preset distance threshold.

In this embodiment, in a case that the candidate vehicle that is in the vehicle-following mode at the previous frame moment is determined, the physical distance that is between the candidate vehicle in the vehicle-following mode and the target vehicle and that is at the current frame moment is calculated, so that whether the candidate vehicle that is in the vehicle-following mode at the previous frame moment is still in the vehicle-following mode at the current frame moment can be quickly and accurately determined. In this way, once it is determined that the candidate vehicle that is in the vehicle-following mode at the previous frame moment is still in the vehicle-following mode at the current frame moment, the relative location error degree and the matching confidence do not need to be calculated, so that when the calculation amount is reduced, the reliability of the vehicle matching result at the current frame moment is ensured.

In some embodiments, the method further includes: in a case that the physical distance is greater than the preset distance threshold, performing the operation of calculating a relative location error degree between the target vehicle and each candidate vehicle based on the floating vehicle data and the candidate vehicle sensing data that are at the current frame moment.

In some embodiments, when the physical distance is greater than the preset distance threshold, the server determines that the candidate vehicle that is in the vehicle-following mode at the previous frame moment is not in the vehicle-following mode at the current frame moment, and the server performs the operation of calculating a relative location error degree between the target vehicle and each candidate vehicle based on the floating vehicle data and the candidate vehicle sensing data that are at the current frame moment.

When the physical distance is greater than the preset distance threshold, it indicates that the distance between the candidate vehicle that is in the vehicle-following mode at the previous frame moment and the target vehicle is large at the current frame moment, and the server determines that the candidate vehicle that is in the vehicle-following mode at the previous frame moment does not remain in the vehicle-following mode at the current frame moment. Based on this, the server needs to calculate the relative location error degree and the matching confidence based on the candidate vehicle sensing data of the at least one candidate vehicle in the candidate geographic region and the floating vehicle data of the target vehicle that are at the current frame moment, so that the server performs vehicle matching at the current frame moment in time based on the relative location error degree and the matching confidence that are calculated at the current frame moment.

In this embodiment, once it is detected, through verification, that the physical distance between the candidate vehicle that is in the vehicle-following mode at the previous frame moment and the target vehicle at the current frame moment is greater than the preset distance threshold, the operation of calculating a relative location error degree between the target vehicle and each candidate vehicle based on the floating vehicle data and the candidate vehicle sensing data that are at the current frame moment is directly performed, so that the candidate vehicle that is in the vehicle-following mode at the previous frame moment is not mismatched as the candidate vehicle that matches the target vehicle at the current frame moment, and accuracy of vehicle matching at the current frame moment is ensured.

As described above, in a case that it is determined that the candidate vehicle that is in the vehicle-following mode at the previous frame moment does not remain in the vehicle-following mode at the current frame moment, after the candidate vehicle matching the target vehicle at the current frame moment is determined by performing the foregoing operation 206 to operation 212, whether the candidate vehicle successfully matching the target vehicle at the current frame moment is in the vehicle-following mode needs to be further determined.

Therefore, in some embodiments, the method further includes: using the candidate vehicle successfully matching the target vehicle as a host vehicle; when the relative location error degree between the host vehicle and the target vehicle satisfies the preset error-degree threshold condition of the vehicle-following mode and the matching confidence between the host vehicle and the target vehicle satisfies the preset confidence threshold condition of the vehicle-following mode at the current frame moment, recording that the host vehicle is in the vehicle-following mode; and adding an identifier of the vehicle-following mode to candidate vehicle sensing data that is of the host vehicle and that is at the current frame moment.

In some embodiments, the server uses the candidate vehicle successfully matching the target vehicle as the host vehicle, and obtains the relative location error degree and the matching confidence that are between the host vehicle and the target vehicle and that are at the current frame moment. In a case that the relative location error degree between the host vehicle and the target vehicle is not greater than the preset error-degree threshold of the vehicle-following mode, the server determines that the relative location error degree between the host vehicle and the target vehicle satisfies the preset error-degree threshold condition of the vehicle-following mode. After determining that the relative location error degree between the host vehicle and the target vehicle satisfies the preset error-degree threshold condition of the vehicle-following mode, the server continues to determine whether the matching confidence between the host vehicle and the target vehicle satisfies the preset confidence threshold condition of the vehicle-following mode. In a case that the matching confidence between the host vehicle and the target vehicle is not less than the preset confidence threshold of the vehicle-following mode, the server determines that the matching confidence between the host vehicle and the target vehicle satisfies the preset confidence threshold condition of the vehicle-following mode. The server records that the host vehicle is in the vehicle-following mode at the current frame moment, and adds the identifier of the vehicle-following mode to the candidate vehicle sensing data that is of the host vehicle and that is at the current frame moment.

In a case that the relative location error degree between the host vehicle and the target vehicle is greater than the preset error-degree threshold of the vehicle-following mode, it is determined that the relative location error degree between the host vehicle and the target vehicle does not satisfy the preset error-degree threshold condition of the vehicle-following mode, and it is determined that the host vehicle is not in the vehicle-following mode at the current frame moment. In a case that the relative location error degree between the host vehicle and the target vehicle satisfies the preset error-degree threshold condition of the vehicle-following mode, but the matching confidence between the host vehicle and the target vehicle does not satisfy the preset confidence threshold condition of the vehicle-following mode, the server determines that the host vehicle is not in the vehicle-following mode at the current frame moment.

An importance level of determining whether the candidate vehicle successfully matching the target vehicle at the current frame moment satisfies a requirement of being in the vehicle-following mode at the current frame moment is higher than an importance level of determining whether the candidate vehicle successfully matching the target vehicle exists. Therefore, the preset error-degree threshold $S_{td_{t}rack}$ of the vehicle-following mode is less than the preset error-degree threshold $S_{td_{m}atch}$, and the preset confidence threshold $C_{td_{t}rack}$ of the vehicle-following mode is greater than the preset confidence threshold $C_{td_{m}atch}$. That is, $S_{td_{t}rack}<S_{td_{m}atch}$, and $C_{td_{t}rack}>C_{td_{m}atch}$.

For example, for the host vehicle at the current frame moment, the relative location error degree that is between the host vehicle and the target vehicle and that is at the current frame moment is S, and the matching confidence that is between the host vehicle and the target vehicle and that is at the current frame moment is C. If S and C both satisfy the following formula, it is determined that the host vehicle is in the vehicle-following mode at the current frame moment:

$$S \leq S_{td\_match}$$

$$C \geq C_{td\_match}$$

In this embodiment, in a case that it is determined that the candidate vehicle that is in the vehicle-following mode at the previous frame moment does not remain in the vehicle-following mode at the current frame moment, and the candidate vehicle successfully matching the target vehicle at the current frame moment is determined, the candidate vehicle successfully matching the target vehicle is used as the host vehicle. When the relative location error degree between the host vehicle and the target vehicle satisfies the preset error-degree threshold condition of the vehicle-following mode and the matching confidence between the host vehicle and the target vehicle satisfies the preset confidence threshold condition of the vehicle-following mode, it can be accurately determined that the host vehicle is in the vehicle-following mode at the current frame moment, and the identifier of the vehicle-following mode is added, in real time, to the candidate vehicle sensing data that is of the host vehicle and that is at the current frame moment, to ensure that an operation of matching the target vehicle can be performed at a next frame moment based on the candidate vehicle that is in the vehicle-following mode at the current frame moment.

As described above, for each candidate vehicle, a higher matching confidence between the candidate vehicle and the target vehicle indicates higher credibility of the relative location error degree between the candidate vehicle and the target vehicle. In other words, when a proximity degree between the candidate vehicle and the target vehicle is higher, the candidate vehicle and the target vehicle are closer. Therefore, a weight value is introduced to reflect the credibility of the relative location error degree between each candidate vehicle and the target vehicle. In this way, w weight of a candidate vehicle corresponding to a low relative location error degree can be adaptively increased, and a weight of a candidate vehicle corresponding to a high relative location error degree is decreased.

Therefore, in some embodiments, the calculating a matching confidence that is between the target vehicle and each candidate vehicle and that is at the current frame moment based on the relative location error degree that is between the target vehicle and each candidate vehicle and that is at the current frame moment includes: calculating, for each candidate vehicle, a weight value that is of the candidate vehicle and that is at the current frame moment based on the relative location error degree that is between the target vehicle and the candidate vehicle and that is at the current frame moment, where the weight value is negatively correlated with the corresponding relative location error degree; and calculating, based on the weight value that respectively corresponds to the at least one candidate vehicle and that is at the current frame moment, the matching confidence that is between the target vehicle and each candidate vehicle and that is at the current frame moment, where the matching confidence is positively correlated with each weight value respectively.

In some embodiments, for each candidate vehicle, the server obtains a reciprocal of the relative location error degree that is between the target vehicle and the candidate vehicle and that is at the current frame moment, and uses a difference between the reciprocal corresponding to the candidate vehicle and a unit value as the weight value that is of the candidate vehicle and that is at the current frame moment. The weight value that is of the candidate vehicle and that is at the current frame moment is negatively correlated with the relative location error degree that is between the candidate vehicle and the target vehicle and that is at the current frame moment. The server calculates, based on the weight value that respectively corresponds to the at least one candidate vehicle and that is at the current frame moment, the matching confidence that is between the target vehicle and each candidate vehicle and that is at the current frame moment, where the matching confidence is positively correlated with each weight value respectively.

The relative location error degree is a ratio. Therefore, for each candidate vehicle, the reciprocal of the relative location error degree that is between the target vehicle and the candidate vehicle and that is at the current frame moment is obtained, and the obtained value is a value greater than 1. Therefore, the difference between the reciprocal corresponding to the candidate vehicle and the unit value is a value greater than 0.

For example, in a case that one candidate vehicle exists in the candidate geographic region at the current frame moment, the server obtains a reciprocal of a relative location error degree between the target vehicle and the existing candidate vehicle, and uses a difference between the reciprocal and the unit value as a weight value that is of the existing candidate vehicle and that is at the current frame moment. The server determines, based on the weight value that is of the candidate vehicle existing in the candidate geographic region and that is at the current frame moment, a matching confidence that is between the target vehicle and the candidate vehicle existing in the candidate geographic region and that is at the current frame moment.

In a case that at least two candidate vehicles exist in the candidate geographic region at the current frame moment, for each candidate vehicle, the server obtains a reciprocal of the relative location error degree that is between the target vehicle and the candidate vehicle and that is at the current frame moment, and uses a difference between the reciprocal corresponding to the candidate vehicle and a unit value as the weight value that is of the candidate vehicle and that is at the current frame moment. In this way, weight values respectively corresponding to the candidate vehicles are determined. For each candidate vehicle, the server uses a vehicle other than the candidate vehicle in the candidate geographic region as a reference vehicle. The server determines, based on the weight value corresponding to the candidate vehicle and the weight value respectively corresponding to each reference vehicle, a matching confidence that is between the target vehicle and each candidate vehicle and that is at the current frame moment.

For example, for each candidate vehicle, the weight value P that is of the candidate vehicle and that is at the current frame moment may be determined with reference to the following formula:

$$P = \frac{1}{S} - 1,\ P \in (0, +\infty)$$

S is the relative location error degree that is between the candidate vehicle and the target vehicle and that is at the current frame moment. A value range of the weight value P that is of the candidate vehicle and that is at the current frame moment is being greater than 0.

In this embodiment, for each candidate vehicle, the weight value that is of the candidate vehicle and that is at the current frame moment is determined based on the relative location error degree that is between the target vehicle and the candidate vehicle and that is at the current frame moment. In this way, the matching confidence that is between the target vehicle and each candidate vehicle and that is at the current frame moment can be accurately obtained based on the weight value respectively corresponding to each candidate vehicle at the current frame moment.

In some embodiments, the calculating, based on the weight value that respectively corresponds to the at least one candidate vehicle and that is at the current frame moment, the matching confidence that is between the target vehicle and each candidate vehicle and that is at the current frame moment, where the matching confidence is positively correlated with each weight value respectively includes: calculating a sum of the weight values that respectively correspond to the at least one candidate vehicle and that are at the current frame moment; calculating, for each candidate vehicle, a proportion of the weight value that corresponds to the candidate vehicle and that is at the current frame moment to the sum; and determining, based on the proportion, the matching confidence that is between the target vehicle and each candidate vehicle and that is at the current frame moment.

After the server obtains the weight values that respectively correspond to the at least one candidate vehicle in the candidate geographic region and that are at the current frame moment, for a weight value $P_i$ that corresponds to any candidate vehicle and that is at the current frame moment, the sum $$\sum_{i=1}^{n} P_i$$

of the weight values that respectively correspond to the at least one candidate vehicle and that are at the current frame moment is calculated by using a summation function. n is a quantity of candidate vehicles in the candidate geographic region. For each candidate vehicle, the weight value corresponding to the candidate vehicle is $P_k$. In this case, the proportion $C_k$ corresponding to the candidate vehicle may be calculated by using the following formula:

$$C_k = \frac{P_k}{\sum_{i=1}^{n} P_i},\ C_k \in (0, 1]$$

A value range of the proportion $C_k$ corresponding to the candidate vehicle is being greater than 0 and less than or equal to 1.

In a case that one candidate vehicle exists in the candidate geographic region at the current frame moment, n is 1. Therefore, the proportion corresponding to the candidate vehicle existing in the candidate geographic region at the current frame moment is 1, that is, $$P_k = \sum_{i=1}^{n} P_i.$$

In a case that at least two candidate vehicles exist in the candidate geographic region at the current frame moment, n is greater than 1. For each candidate vehicle, it can be learned from the foregoing formula for the proportion corresponding to the candidate vehicles that the numerator $P_k$ is less than the denominator $$\sum_{i=1}^{n} P_i.$$

Therefore, in this case, the proportion corresponding to the candidate vehicle is greater than 0 and less than 1.

In this embodiment, the sum of the weight values that respectively correspond to the at least one candidate vehicle and that are at the current frame moment is calculated; the proportion of the weight value that corresponds to each candidate vehicle and that is at the current frame moment to the sum is calculated for the candidate vehicle; and the matching confidence that is between the target vehicle and each candidate vehicle and that is at the current frame moment can be calculated based on the proportion.

In some embodiments, the satisfying an error-degree threshold condition is being not greater than a preset error-degree threshold. The method further includes: determining, for a candidate vehicle in the at least one candidate vehicle, that the candidate vehicle does not match the target vehicle when a relative location error degree between the candidate vehicle and the target vehicle is greater than the error-degree threshold.

For example, for the candidate vehicle in the at least one candidate vehicle, when the relative location error degree between the candidate vehicle and the target vehicle is greater than the error-degree threshold, the server determines that the candidate vehicle does not match the target vehicle, and determines whether a relative location error degree between a next candidate vehicle and the target vehicle is greater than the error-degree threshold until it is determined that each of the at least one candidate vehicle does not match the target vehicle. In this case, the server determines that all the candidate vehicles do not match the target vehicle at the current frame moment.

In this embodiment, for the candidate vehicle in the at least one candidate vehicle, when the relative location error degree between the candidate vehicle and the target vehicle is greater than the error-degree threshold, it is directly and quickly determined that the candidate vehicle does not match the target vehicle, thereby improving efficiency of vehicle matching and effectively avoiding a matching mistake.

In some embodiments, the satisfying a confidence threshold condition is being not less than a preset confidence threshold. The method further includes: determining, for a candidate vehicle in the at least one candidate vehicle, that the candidate vehicle does not match the target vehicle when a matching confidence between the candidate vehicle and the target vehicle is less than the confidence threshold.

For example, for the candidate vehicle in the at least one candidate vehicle, when the relative location error degree between the candidate vehicle and the target vehicle is not greater than the error-degree threshold, the server determines whether the matching confidence between the candidate vehicle and the target vehicle is less than the confidence threshold. When the server determines that the relative location error degree between the candidate vehicle and the target vehicle is not greater than the error-degree threshold, and the matching confidence between the candidate vehicle and the target vehicle is less than the confidence threshold, the server determines that the candidate vehicle does not match the target vehicle, and determines whether a relative location error degree between a next candidate vehicle and the target vehicle is greater than the error-degree threshold until it is determined that each of the at least one candidate vehicle does not match the target vehicle. In this case, the server determines that all the candidate vehicles do not match the target vehicle at the current frame moment.

In this embodiment, for the candidate vehicle in the at least one candidate vehicle, once it is determined that the matching confidence between the candidate vehicle and the target vehicle is less than the confidence threshold, it can be directly determined that the candidate vehicle does not match the target vehicle, thereby effectively avoiding a matching mistake.

Figure 6:
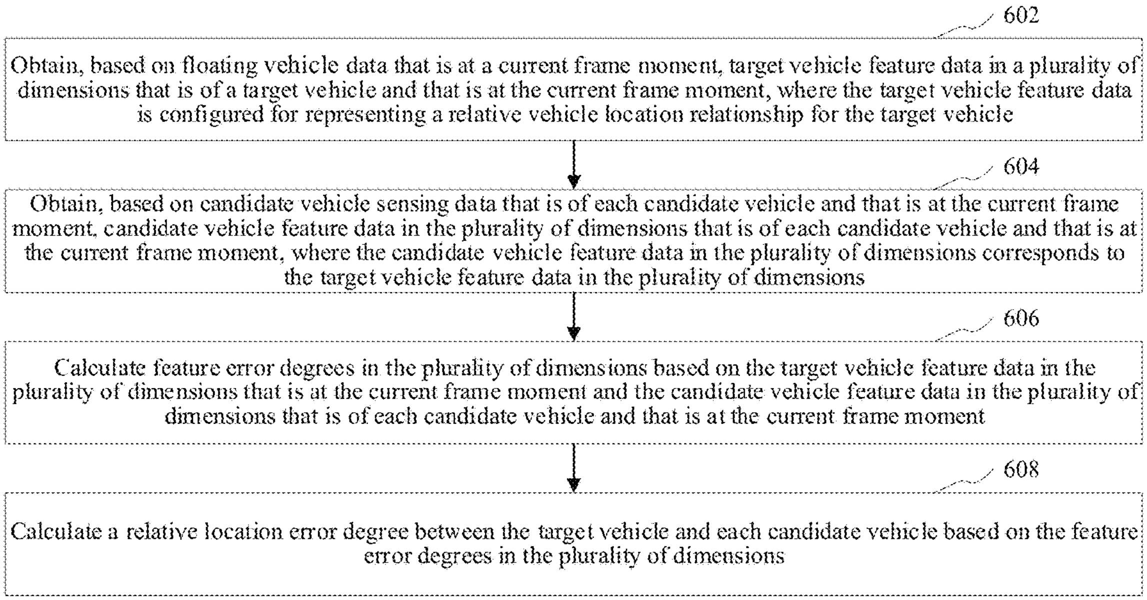
FIG. 6 is a schematic flowchart of an operation of determining a relative location error degree according to an embodiment.

In some embodiments, FIG. 6 is a schematic flowchart of an operation of determining a relative location error degree according to an embodiment. The respectively determining a relative location error degree between the target vehicle and each candidate vehicle based on the floating vehicle data and the candidate vehicle sensing data that are at the current frame moment includes the following operations.

Operation 602: Obtain, based on the floating vehicle data that is at the current frame moment, target vehicle feature data in a plurality of dimensions (i.e., multi-dimensional target vehicle feature data) that is of the target vehicle and that is at the current frame moment, where the target vehicle feature data is configured for representing a relative vehicle location relationship for the target vehicle.

The plurality of dimensions include at least two of a distance dimension, a direction dimension, a speed dimension, and a trajectory dimension. The target vehicle feature data refers to vehicle data corresponding to a dimension. For example, for the distance dimension, the corresponding target vehicle feature data is the geographic location of the target vehicle. For another example, for the speed dimension, the corresponding target vehicle feature data is a speed of the target vehicle.

In some embodiments, the server obtains, from the floating vehicle data that is at the current frame moment, the target vehicle feature data in the plurality of dimensions that is of the target vehicle and that is at the current frame moment.

Operation 604: Obtain, based on the candidate vehicle sensing data that is of each candidate vehicle and that is at the current frame moment, candidate vehicle feature data in the plurality of dimensions (i.e., multi-dimensional candidate vehicle feature data) that is of each candidate vehicle and that is at the current frame moment, where the candidate vehicle feature data in the plurality of dimensions corresponds to the target vehicle feature data in the plurality of dimensions.

In some embodiments, for each candidate vehicle, the server obtains, from the candidate vehicle sensing data that is of the candidate vehicle and that is at the current frame moment, the candidate vehicle feature data in the plurality of dimensions that is of each candidate vehicle and that is at the current frame moment. The candidate vehicle feature data in the plurality of dimensions corresponds to the target vehicle feature data in the plurality of dimensions.

That the candidate vehicle feature data in the plurality of dimensions corresponds to the target vehicle feature data in the plurality of dimensions may be understood as that the dimensions involved in the candidate vehicle feature data in the plurality of dimensions are the same as the dimensions involved in the target vehicle feature data in the plurality of dimensions.

For example, the server obtains, for each candidate vehicle and each dimension based on the plurality of dimensions involved in the target vehicle feature data, candidate vehicle feature data corresponding to the dimension from the candidate vehicle sensing data of the candidate vehicle.

Operation 606: Calculate feature error degrees in the plurality of dimensions (i.e., multi-dimensional feature error degrees) based on the target vehicle feature data in the plurality of dimensions that is at the current frame moment and the candidate vehicle feature data in the plurality of dimensions that is of each candidate vehicle and that is at the current frame moment.

In some embodiments, for each dimension, the server determines, based on the target vehicle feature data in the dimension and the candidate vehicle feature data of each candidate vehicle that are at the current frame moment, a sub error degree corresponding to each candidate vehicle in the dimension. For each candidate vehicle, the server determines, based on the sub error degrees respectively corresponding to the candidate vehicle in the dimensions, the feature error degrees corresponding to the candidate vehicle in the plurality of dimensions. The feature error degrees in the plurality of dimensions include the sub error degrees respectively corresponding to the dimensions. For example, a sub error degree corresponding to the distance dimension is a distance error degree, a sub error degree corresponding to the direction dimension is an azimuth error degree, a sub error degree corresponding to the speed dimension is a speed error degree, and a sub error degree corresponding to the trajectory dimension is a trajectory error degree.

Operation 608: Calculate the relative location error degree between the target vehicle and each candidate vehicle based on the feature error degrees in the plurality of dimensions.

In some embodiments, for each candidate vehicle, the server obtains the feature error degrees corresponding to the candidate vehicle in the plurality of dimensions, and combines the feature error degrees in the plurality of dimensions, to determine the relative location error degree between the target vehicle and the candidate vehicle.

Because the feature data in the plurality of dimensions is involved in the foregoing process of determining the relative location error degree, the relative location error degree is obtained by using an idea of an uncertain reasoning theory based on the feature data in the plurality of dimensions. That is, the feature data in the plurality of dimensions is considered as criteria of the plurality of dimensions. In this case, the relative location error degree with high reliability can be determined by fusing the criteria of the plurality of dimensions. Specifically, the server may determine a weight of each dimension based on an actual requirement, and obtain the relative location error degree through weighted summation based on the weight of each dimension and the sub error degrees respectively corresponding to the dimensions. The server may alternatively obtain the relative location error degree by obtaining a basic probability assignment function to fuse the sub error degrees respectively corresponding to the dimensions.

In this embodiment, the feature error degrees in the plurality of dimensions are determined based on the target vehicle feature data in the plurality of dimensions and the candidate vehicle feature data of each candidate vehicle in the plurality of dimensions that are at the current frame moment. In this way, the relative location error degree between the target vehicle and each candidate vehicle can be effectively and accurately determined by comprehensively considering the feature error degrees in the plurality of dimensions.

In some embodiments, the target vehicle feature data includes the geographic location of the target vehicle, the candidate vehicle feature data includes a geographic location of the corresponding candidate vehicle, and the feature error degrees in the plurality of dimensions include a distance error degree. The distance error degree is determined through an operation of determining the distance error degree, and the operation of determining the distance error degree includes: calculating, for each candidate vehicle, a straight-line distance between the candidate vehicle and the target vehicle respectively based on a geographic location that is of the candidate vehicle and that is at the current frame moment and the geographic location that is of the target vehicle and that is at the current frame moment; and calculating the distance error degree between the candidate vehicle and the target vehicle based on the straight-line distance when the straight-line distance is less than a preset straight-line distance threshold.

In some embodiments, for each candidate vehicle, the server calculates the straight-line distance between the candidate vehicle and the target vehicle respectively based on the longitude and the latitude in the geographic location that is of the candidate vehicle and that is at the current frame moment and the longitude and the latitude in the geographic location that is of the target vehicle and that is at the current frame moment.

In a case that the straight-line distance is less than the preset straight-line distance threshold, the server compares the straight-line distance with the straight-line distance threshold. In a case that the straight-line distance is not less than the preset straight-line distance threshold, the server directly filters out the candidate vehicle, that is, does not calculate the relative location error degree for the candidate vehicle, in other words, the candidate vehicle is not used as the candidate vehicle matching the target vehicle.

For example, in the case that the straight-line distance is less than the preset straight-line distance threshold, the server determines a ratio of the straight-line distance to the straight-line distance threshold as the distance error degree between the candidate vehicle and the target vehicle. For example, the distance error degree $S_d$ between the candidate vehicle and the target vehicle is determined based on the following formula:

$$S_d = \frac{d}{D_{td}},\ S_d \in [0, 1)$$

d is the straight-line distance, and $D_{td}$ is the straight-line distance threshold. A value range of the distance error degree is being not less than 0 and less than 1. When the geographic location of the candidate vehicle coincides with the geographic location of the target vehicle, that is, the straight-line distance is 0, the distance error degree between the candidate vehicle and the target vehicle is 0.

In this embodiment, in the case that the straight-line distance is less than the preset straight-line distance threshold, the distance error degree between the candidate vehicle and the target vehicle can be accurately determined based on the straight-line distance.

In some embodiments, the target vehicle feature data includes an azimuth of the target vehicle, the candidate vehicle feature data includes an azimuth of the corresponding candidate vehicle, and the feature error degrees in the plurality of dimensions include an azimuth error degree. The azimuth error degree is determined through an operation of determining the azimuth error degree, and the operation of determining the azimuth error degree includes: calculating, for each candidate vehicle, an azimuth difference between the candidate vehicle and the target vehicle respectively based on an azimuth that is of the candidate vehicle and that is at the current frame moment and an azimuth that is of the target vehicle and that is at the current frame moment; and calculating the azimuth error degree between the candidate vehicle and the target vehicle based on the azimuth difference when the azimuth difference is less than a preset azimuth difference threshold.

The azimuth difference is an absolute value of a difference between azimuths. The azimuth difference threshold is a maximum value of a range of the azimuth difference. The azimuth usually refers to an angle that is not greater than 90° and between a target direction and a north or south direction and that uses a location of an observer as a center.

In some embodiments, the server calculates, for each candidate vehicle, a difference between the azimuth that is of the candidate vehicle and that is at the current frame moment and the azimuth that is of the target vehicle and that is at the current frame moment, and uses an absolute value of the difference as the azimuth difference between the candidate vehicle and the target vehicle.

In a case that the azimuth difference is less than the preset azimuth difference threshold, the server determines a minimum value of the range of the azimuth difference. When the azimuth difference is not less than the minimum value, the server calculates the azimuth error degree between the candidate vehicle and the target vehicle based on the azimuth difference and the azimuth difference threshold. When the azimuth difference is less than the minimum value, the server calculates the azimuth error degree between the candidate vehicle and the target vehicle based on the azimuth difference threshold and the minimum value.

When the azimuth difference is not less than the azimuth difference threshold, the server directly filters out the candidate vehicle, that is, does not calculate the relative location error degree for the candidate vehicle, in other words, the candidate vehicle is not used as the candidate vehicle matching the target vehicle.

For example, when the azimuth difference is not less than the minimum value, the server determines a ratio of the azimuth difference to the azimuth difference threshold as the azimuth error degree between the candidate vehicle and the target vehicle. When the azimuth difference is less than the minimum value, the server determines a ratio of the minimum value to the azimuth difference threshold as the azimuth error degree between the candidate vehicle and the target vehicle. For example, the azimuth error degree $S_h$ between the candidate vehicle and the target vehicle is determined based on the following formula:

$$S_h = \begin{cases} \frac{\Delta\theta}{\theta_{td\_max}}, & \Delta\theta \geq \theta_{td\_min} \\ \frac{\theta_{td\_min}}{\theta_{td\_max}}, & \Delta\theta < \theta_{td\_min} \end{cases},$$

$$S_h \in [0, 1)$$

$\Delta\theta$ is the azimuth difference, where $\Delta\theta=|h_f-h_{si}|$. $h_f$ and $h_{si}$ are respectively the azimuth that is of the target vehicle and that is at the current frame moment and the azimuth that is of the candidate vehicle and that is at the current frame moment, where a radian is used as a unit. $\theta_{td\_min}$ is the minimum value of the range of the azimuth difference. $\theta_{td\_max}$ is the azimuth difference threshold, namely, the maximum value of the range of the azimuth difference. A value range of the azimuth error degree is being not less than 0 and less than 1. When the azimuth of the candidate vehicle coincides with the azimuth of the target vehicle, that is, the azimuth difference is 0, the azimuth error degree between the candidate vehicle and the target vehicle is 0.

In this embodiment, in the case that the azimuth difference is less than the preset azimuth difference threshold, the azimuth error degree between the candidate vehicle and the target vehicle can be accurately determined based on the azimuth difference.

In some embodiments, the target vehicle feature data includes a speed of the target vehicle, the candidate vehicle feature data includes a speed of the corresponding candidate vehicle, and the feature error degrees in the plurality of dimensions include a speed error degree. The speed error degree is determined through an operation of determining the speed error degree, and the operation of determining the speed error degree includes: calculating, for each candidate vehicle, a speed difference between the candidate vehicle and the target vehicle respectively based on a speed that is of the candidate vehicle and that is at the current frame moment and a speed that is of the target vehicle and that is at the current frame moment; and calculating the speed error degree between the candidate vehicle and the target vehicle based on the speed difference when the speed difference is less than a preset speed difference threshold.

The speed difference is an absolute value of a difference between speeds. The speed difference threshold is a maximum value of a range of the speed difference.

In some embodiments, the server calculates, for each candidate vehicle, a difference between the speed that is of the candidate vehicle and that is at the current frame moment and the speed that is of the target vehicle and that is at the current frame moment, and uses an absolute value of the difference as the speed difference between the candidate vehicle and the target vehicle.

When the speed difference is less than the preset speed difference threshold, the server determines a minimum value of the range of the speed difference. When the speed difference is not less than the minimum value, the server determines the speed error degree between the candidate vehicle and the target vehicle based on the speed difference and the speed difference threshold. When the speed difference is less than the minimum value, the server determines the speed error degree between the candidate vehicle and the target vehicle based on the speed difference threshold and the minimum value.

When the speed difference is not less than the speed difference threshold, the server directly filters out the candidate vehicle, that is, does not calculate the relative location error degree for the candidate vehicle, in other words, the candidate vehicle is not used as the candidate vehicle matching the target vehicle.

For example, when the speed difference is not less than the minimum value, the server determines a ratio of the speed difference to the speed difference threshold as the speed error degree between the candidate vehicle and the target vehicle. When the speed difference is less than the minimum value, the server determines a ratio of the minimum value to the speed difference threshold as the speed error degree between the candidate vehicle and the target vehicle. For example, the speed error degree $S_v$ between the candidate vehicle and the target vehicle is determined based on the following formula:

$$S_v = \begin{cases} \frac{\Delta v}{V_{td\_max}}, & \Delta v \geq V_{td\_min} \\ \frac{V_{td\_min}}{V_{td\_max}}, & \Delta v < V_{td\_min} \end{cases},$$

$$S_v \in [0, 1)$$

$\Delta v$ is the speed difference, where $\Delta v=|v_f-v_{si}|$. $v_f$ and $v_{si}$ are respectively the speed that is of the target vehicle and that is at the current frame moment and the speed that is of the candidate vehicle and that is at the current frame moment, where meters per second is used as a unit. $V_{td\_min}$ is the minimum value of the range of the speed difference. $V_{td\_max}$ is the speed difference threshold, namely, the maximum value of the range of the speed difference. A value range of the speed error degree is being not less than 0 and less than 1. When the speed of the candidate vehicle is the same as the speed of the target vehicle, that is, the speed difference is 0, the speed error degree between the candidate vehicle and the target vehicle is 0.

In this embodiment, in the case that the speed difference is less than the preset speed difference threshold, the speed error degree between the candidate vehicle and the target vehicle can be accurately determined based on the speed difference.

In some embodiments, the target vehicle feature data includes the geographic location of the target vehicle, the candidate vehicle feature data includes a geographic location of the corresponding candidate vehicle, and the feature error degrees in the plurality of dimensions include a trajectory error degree. The trajectory error degree is determined through an operation of determining the trajectory error degree, and the operation of determining the trajectory error degree includes: determining a time period based on the current frame moment and a time step; determining, for each candidate vehicle, a candidate trajectory of the candidate vehicle within the time period based on a first sampling frequency of the geographic location of the candidate vehicle, where the candidate trajectory includes geographic locations of the candidate vehicle that respectively correspond to sampling points in the time period; determining a target trajectory of the target vehicle within the time period based on a second sampling frequency of the geographic location of the target vehicle, where the target trajectory includes geographic locations of the target vehicle that respectively correspond to the sampling points in the time period; calculating, for each candidate vehicle, a warping distance between the candidate trajectory of the candidate vehicle and the target trajectory of the target vehicle respectively based on the candidate trajectory of the candidate vehicle within the time period and the target trajectory of the target vehicle within the time period; and calculating the trajectory error degree between the candidate vehicle and the target vehicle based on the warping distance when the warping distance is less than a preset warping distance threshold.

The sampling frequency refers to sampling geographic locations based on a specific frequency. The first sampling frequency of the geographic location of the candidate vehicle and the second sampling frequency of the geographic location of the target vehicle may be the same or different. The warping distance is configured for representing similarity between two trajectories. A smaller warping distance indicates higher similarity between the two trajectories.

In some embodiments, the server obtains the current frame moment and the time step, calculates a difference of the current frame moment minus the time step, calculates a sum of the current frame moment plus the time step, and uses the difference and the sum as an initial moment and an end moment of the time period respectively. The server determines, for each candidate vehicle, the candidate trajectory of the candidate vehicle within the time period based on the first sampling frequency of the geographic location of the candidate vehicle. The server determines the target trajectory of the target vehicle within the time period based on the second sampling frequency of the geographic location of the target vehicle. The server calculates, for each candidate vehicle, the warping distance between the candidate trajectory of the candidate vehicle and the target trajectory of the target vehicle based on the candidate trajectory of the candidate vehicle and the target trajectory of the target vehicle.

In a case that the warping distance is less than the preset warping distance threshold, the trajectory error degree between the candidate vehicle and the target vehicle is determined based on the warping distance. When the warping distance is not less than the warping distance threshold, the server directly filters out the candidate vehicle, that is, does not calculate the relative location error degree for the candidate vehicle, in other words, the candidate vehicle is not used as the candidate vehicle matching the target vehicle.

The warping distance is calculated by using a dynamic time warping processing method, and the candidate trajectory of the candidate vehicle and the target trajectory of the target vehicle can be matched based on the warping distance, rather than being limited to a geographic location of a specific frame.

For example, in the case that the warping distance is less than the preset warping distance threshold, the server uses a ratio of the warping distance to the warping distance threshold as the trajectory error degree between the candidate vehicle and the target vehicle. For example, the trajectory error degree $S_t$ between the candidate vehicle and the target vehicle is determined based on the following formula:

$$S_t = \frac{d_t}{T_{td}},\ S_t \in [0, 1)$$

$d_t$ is the warping distance, and $T_{td}$ is the warping distance threshold. A value range of the trajectory error degree is being not less than 0 and less than 1. When the candidate trajectory of the candidate vehicle coincides with the target trajectory of the target vehicle, that is, the warping distance is 0, the trajectory error degree between the candidate vehicle and the target vehicle is 0.

In this embodiment, for each candidate vehicle, the warping distance between the candidate vehicle and the target vehicle is determined based on the candidate trajectory of the candidate vehicle and the target trajectory of the target vehicle. In the case that the warping distance is less than the warping distance threshold, the trajectory error degree between the candidate vehicle and the target vehicle can be accurately determined based on the warping distance.

Figure 7:
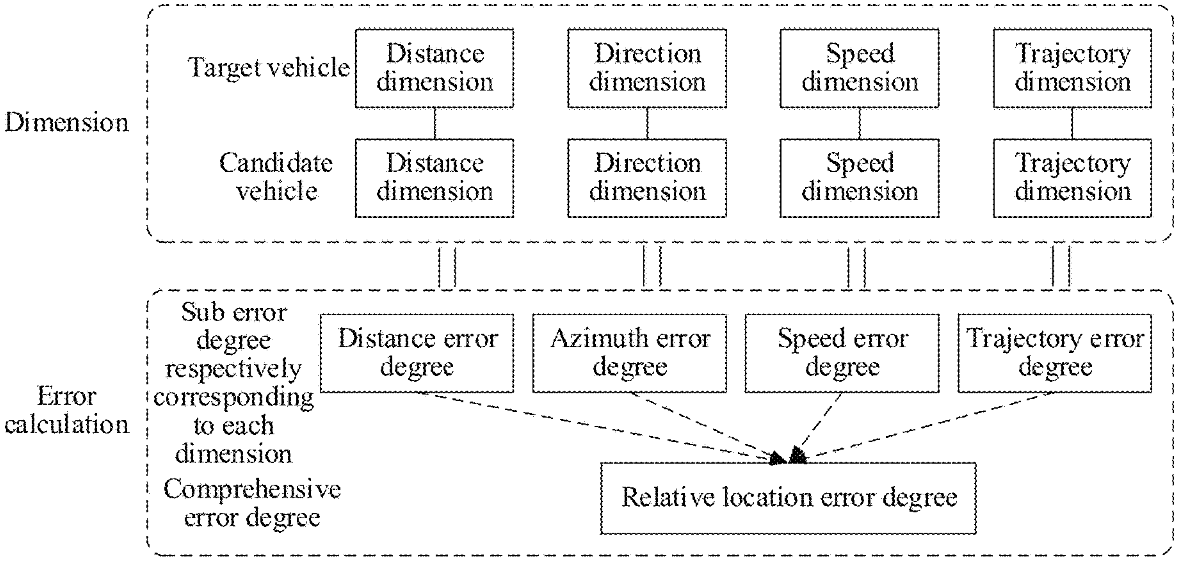
FIG. 7 is a schematic flowchart of determining a relative location error degree according to an embodiment.

Based on this, to improve accuracy and reliability of the relative location error degree between each candidate vehicle and the target vehicle, the relative location error degree may be determined in four dimensions. FIG. 7 is a schematic flowchart of determining a relative location error degree according to an embodiment. A server determines four determining dimensions, respectively a distance dimension, a direction dimension, a speed dimension, and a trajectory dimension. For each candidate vehicle, after determining a sub error degree respectively corresponding to each dimension, to be specific, respectively determining a distance error degree $S_d$ between a candidate vehicle and a target vehicle in the distance dimension, an azimuth error degree $S_h$ between the candidate vehicle and the target vehicle in the direction dimension, a speed error degree $S_v$ between the candidate vehicle and the target vehicle in the speed dimension, and a trajectory error degree $S_t$ between the candidate vehicle and the target vehicle in the trajectory dimension, the server determines a relative location error degree S between the candidate vehicle and the target vehicle by using a basic probability assignment function $f_{ds}$. A formula is as follows:

$$S=f_{ds}(S_d,S_h,S_v,S_t),\ S\in[0,1)$$

A value range of the relative location error degree is being not less than 0 and less than 1. When a straight-line distance between the candidate vehicle and the target vehicle is 0, and azimuth, speeds, and trajectories of the candidate vehicle and the target vehicle are the same, the relative location error degree is 0, in other words, it indicates that the candidate vehicle and the target vehicle coincide.

Figure 8:
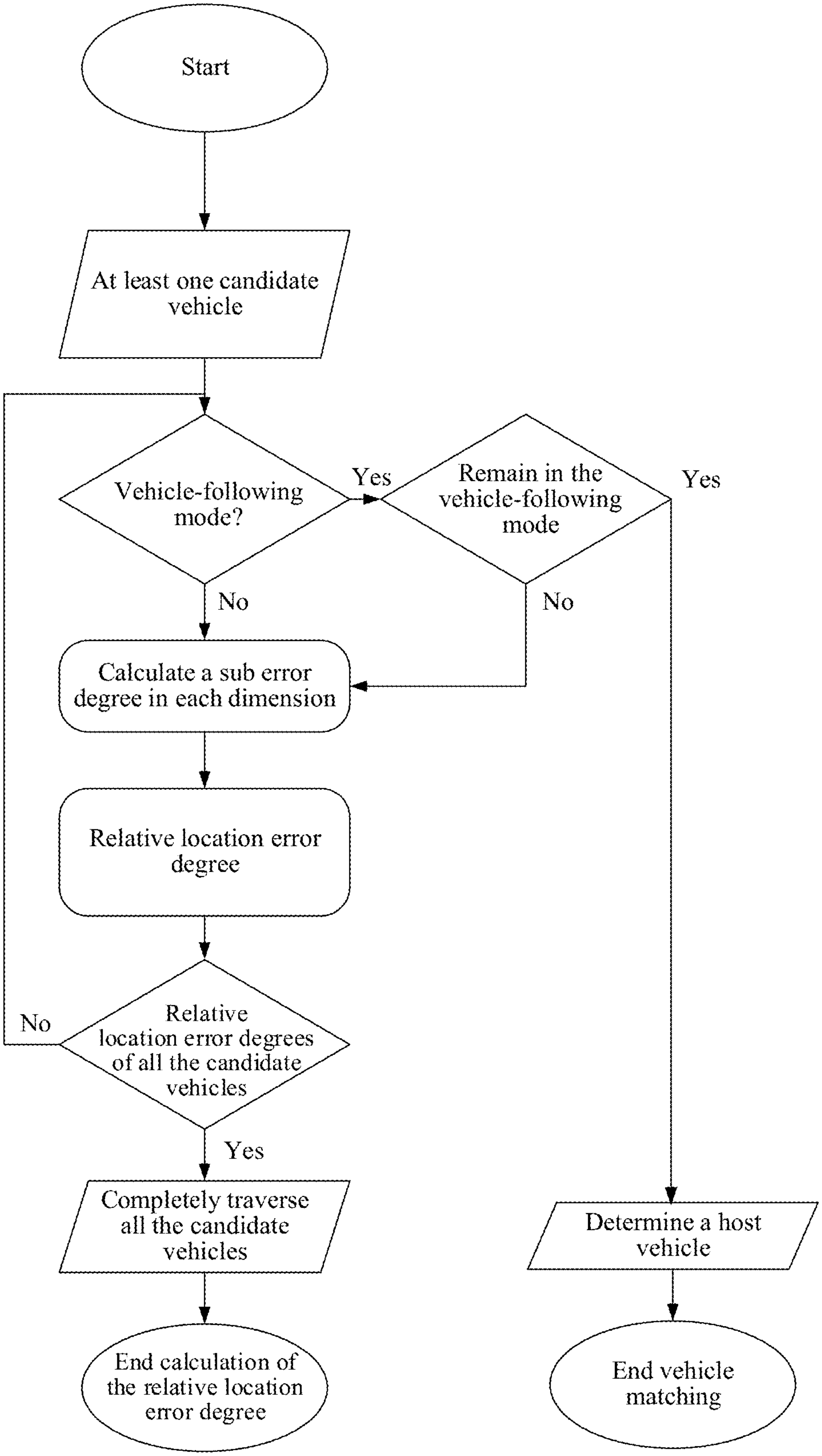
FIG. 8 is a schematic flowchart of determining a relative location error degree according to another embodiment.

Further, FIG. 8 is a schematic flowchart of determining a relative location error degree according to another embodiment. After determining floating vehicle data that is of a target vehicle and that is at a current frame moment, a server determines a geographic location that is of the target vehicle and that is at the current frame moment based on the floating vehicle data. The server obtains the geographic location that is at the current frame moment, determines, based on the geographic location, a candidate geographic region covering the geographic location, and determines, from the candidate geographic region, candidate vehicle sensing data of at least one candidate vehicle. The server obtains candidate vehicle sensing data that is of the at least one candidate vehicle and that is at a previous frame moment, and reads, for each candidate vehicle, an identifier of a vehicle-following mode from the candidate vehicle sensing data that is of the candidate vehicle and that is at the previous frame moment.

When the server successfully reads the identifier of the vehicle-following mode, the server determines that the candidate vehicle is in the vehicle-following mode at the previous frame moment. The server determines a physical distance between the candidate vehicle in the vehicle-following mode and the target vehicle based on the floating vehicle data and that candidate vehicle sensing data of the candidate vehicle that are at the current frame moment. When the physical distance is greater than a preset distance threshold, it is determined that the candidate vehicle in the vehicle-following mode is not in the vehicle-following mode at the current frame moment. When the physical distance is not greater than the preset distance threshold, it is determined that the candidate vehicle in the vehicle-following mode remains in the vehicle-following mode at the current frame moment, the candidate vehicle remaining in the vehicle-following mode is determined as successfully matching the target vehicle, and the candidate vehicle remaining in the vehicle-following mode is determined as a host vehicle. In this case, the server ends vehicle matching.

When the server fails to read the identifier of the vehicle-following mode, it is determined that the candidate vehicle is not in the vehicle-following mode at the previous frame moment. Alternatively, the server determines that the candidate vehicle in the vehicle-following mode is not in the vehicle-following mode at the current frame moment. In this case, the server determines four determining dimensions, respectively a distance dimension, a direction dimension, a speed dimension, and a trajectory dimension. After determining a sub error degree respectively corresponding to each dimension, the server calculates a relative location error degree of a candidate vehicle based on the sub error degree respectively corresponding to each dimension until all the candidate vehicles are traversed, to obtain a relative location error degree of the at least one candidate vehicle. The server ends calculation of the relative location error degree.

In this embodiment, once a candidate vehicle that is in the vehicle-following mode at the previous frame moment and remains in the vehicle-following mode at the current frame moment is verified, the relative location error degree does not need to be calculated, thereby reducing a calculation amount. If a candidate vehicle that is not in the vehicle-following mode at the previous frame moment or a candidate vehicle that is in the vehicle-following mode at the previous frame moment but is not in the vehicle-following mode at the current frame moment is verified, the relative location error degree is accurately determined comprehensively based on the sub error degree in each dimension.

Figure 9:
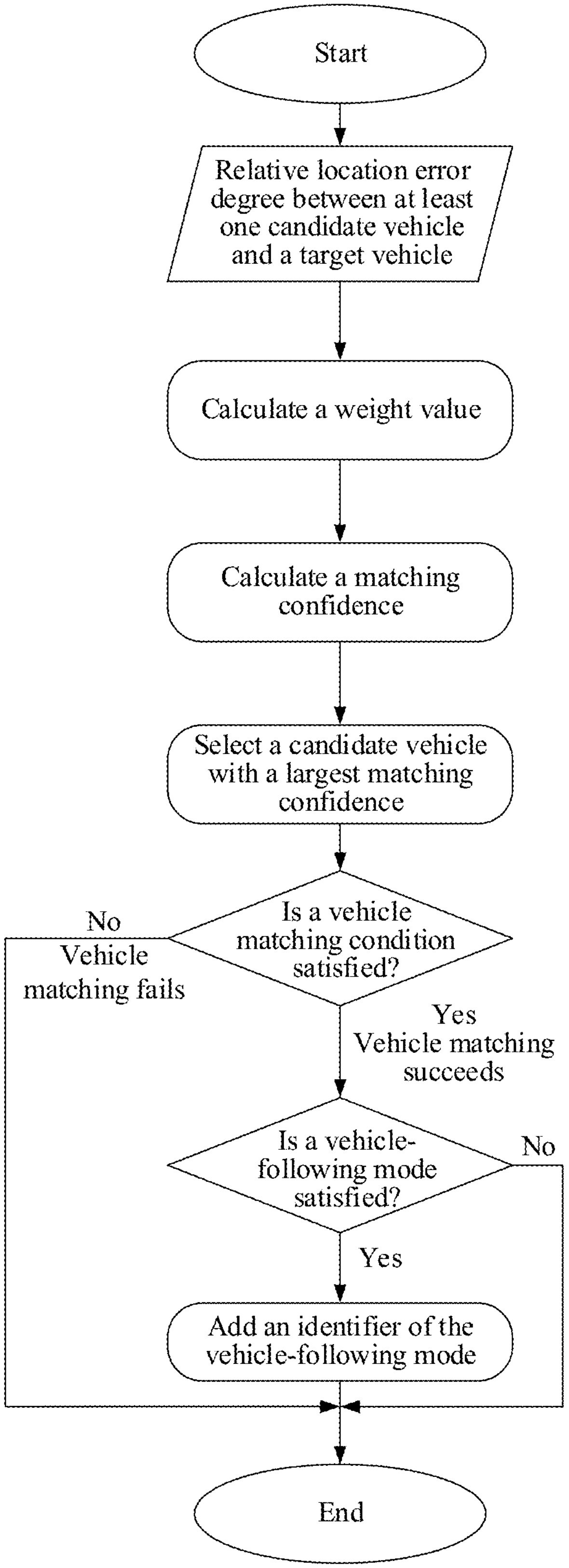
FIG. 9 is a schematic flowchart of an operation of determining a matching confidence according to an embodiment.

Further, FIG. 9 is a schematic flowchart of an operation of determining a matching confidence according to an embodiment. After calculating a relative location error degree between at least one candidate vehicle and a target vehicle, a server correspondingly determines, for each candidate vehicle based on the relative location error degree that is between the target vehicle and the candidate vehicle and that is at the current frame moment, a weight value that is of the candidate vehicle and that is at the current frame moment. The weight value is negatively correlated with the relative location error degree that is between the candidate vehicle and the target vehicle and that is at the current frame moment. A sum of weight values that respectively correspond to the at least one candidate vehicle and that are at the current frame moment is calculated. For each candidate vehicle, the server calculates a proportion of the weight value that corresponds to the candidate vehicle and that is at the current frame moment to the sum. The server determines, based on the proportion, a matching confidence that is between the target vehicle and each candidate vehicle and that is at the current frame moment.

The server selects a candidate vehicle with a largest matching confidence as a to-be-determined candidate vehicle, and determines, based on a relative location error degree and the matching confidence between the to-be-determined candidate vehicle and the target vehicle, whether a vehicle matching condition is satisfied. For example, in a case that the relative location error degree between the to-be-determined vehicle and the target vehicle is greater than an error-degree threshold, the server determines that the to-be-determined vehicle does not match the target vehicle. Alternatively, in a case that the relative location error degree between the to-be-determined vehicle and the target vehicle is not greater than the error-degree threshold, but the matching confidence between the to-be-determined vehicle and the target vehicle is greater than a confidence threshold, the server determines that the to-be-determined vehicle does not match the target vehicle. In this case, the server ends vehicle matching.

In a case that the relative location error degree between the to-be-determined vehicle and the target vehicle is not greater than the error-degree threshold, and the matching confidence between the to-be-determined vehicle and the target vehicle is not less than the confidence threshold, the server determines that the to-be-determined vehicle matches the target vehicle successfully. In this case, the server determines whether the to-be-determined vehicle satisfies a vehicle-following mode. For example, in a case that the relative location error degree between the to-be-determined vehicle and the target vehicle does not satisfy a preset error-degree threshold condition of the vehicle-following mode at the current frame moment, the server determines that the to-be-determined vehicle does not satisfy the vehicle-following mode. Alternatively, in a case that the relative location error degree between the to-be-determined vehicle and the target vehicle satisfies the preset error-degree threshold condition of the vehicle-following mode at the current frame moment, but the matching confidence between the to-be-determined vehicle and the target vehicle does not satisfy a preset confidence threshold condition of the vehicle-following mode, the server determines that the to-be-determined vehicle does not satisfy the vehicle-following mode. In this case, the server ends vehicle matching.

In a case that the relative location error degree between the to-be-determined vehicle and the target vehicle satisfies the preset error-degree threshold condition of the vehicle-following mode at the current frame moment, and the matching confidence between the to-be-determined vehicle and the target vehicle does not satisfy the preset confidence threshold condition of the vehicle-following mode, the server records that the to-be-determined vehicle satisfies the vehicle-following mode, and the server adds an identifier of the vehicle-following mode to the candidate vehicle sensing data that is of the to-be-determined vehicle and that is at the current frame moment. In this case, the server ends vehicle matching.

In this embodiment, after it is determined, based on the vehicle matching condition, that the vehicle matching is successful, whether the candidate vehicle succeeding in the vehicle matching satisfies the vehicle-following mode is determined, to determine, in real time in a timely manner, whether the candidate vehicle succeeding in the vehicle matching is in the vehicle-following mode at the current frame moment. In addition, the identifier of the vehicle-following mode is added, in real time, to the candidate vehicle sensing data of the candidate vehicle satisfying the vehicle-following mode, to ensure that an operation of matching with the target vehicle can be performed at a next frame moment based on the candidate vehicle that is in the vehicle-following mode at the current frame moment.

This application further provides an application scenario. The foregoing vehicle matching method is applied to the application scenario. Specifically, for example, application of the vehicle matching method in the application scenario is as follows: In a scenario of vehicle collision warning, in consideration of that at least one vehicle may exist around a target vehicle under different traffic conditions, to enable the target vehicle to avoid a collision caused by overtaking by the surrounding vehicle, the target vehicle needs to be warned in a timely manner. Based on this, before performing collision warning on the vehicle, a server needs to implement vehicle matching based on floating vehicle data uploaded by a positioning device in the target vehicle and candidate vehicle sensing data uploaded by a sensing device. Specifically, the server obtains the floating vehicle data of the target vehicle, the floating vehicle data being collected frame by frame by the positioning device in the target vehicle, and the floating vehicle data including a geographic location of the target vehicle; determines, based on a geographic location that is at a current frame moment, a candidate geographic region covering the geographic location, and obtains candidate vehicle sensing data of at least one candidate vehicle in the candidate geographic region, the candidate vehicle sensing data being collected frame by frame by the sensing device located in the candidate geographic region; calculates a relative location error degree between the target vehicle and each candidate vehicle based on the floating vehicle data and the candidate vehicle sensing data that are at the current frame moment; calculates a matching confidence that is between the target vehicle and each candidate vehicle and that is at the current frame moment based on the relative location error degree that is between the target vehicle and each candidate vehicle and that is at the current frame moment; selects, from the at least one candidate vehicle, a candidate vehicle whose relative location error degree with the target vehicle satisfies an error-degree threshold condition and whose matching confidence with the target vehicle satisfies a confidence threshold condition; and uses the selected candidate vehicle as a candidate vehicle successfully matching the target vehicle at the current frame moment.

Certainly, this is not limited thereto. The vehicle matching method provided in this application may alternatively be applied to another application scenario. For example, in a blind-spot warning scenario, a driver of a target vehicle attempts to change lanes, but a vehicle may exist at a blind spot of the driver. In this case, blind-spot warning needs to be performed. Before the blind-spot warning, vehicle matching of the target vehicle may be implemented by using the vehicle matching method of this application.

Figure 10:
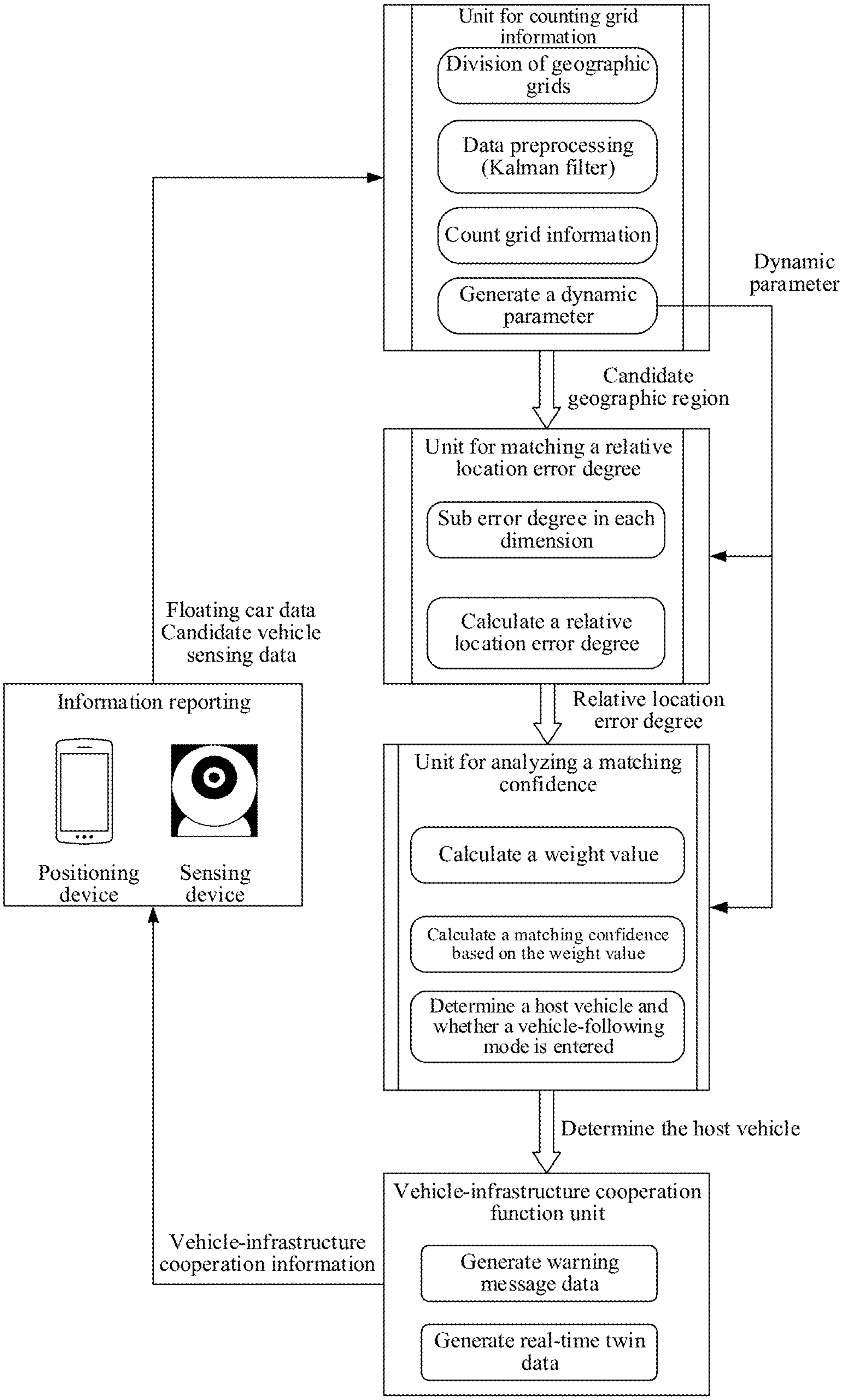
FIG. 10 is a schematic flowchart of a vehicle matching method according to another embodiment.

In a detailed embodiment, FIG. 10 is a schematic flowchart of a vehicle matching method according to another embodiment. A server includes a unit for counting grid information, a unit for matching a relative location error degree, a unit for analyzing a matching confidence, and a vehicle-infrastructure cooperation function unit.

Specifically, the unit for counting grid information in the server divides geographic grids to obtain a preset geographic-grid set, and counts information about each geographic grid based on a storage unit respectively corresponding to each geographic grid. The unit for counting grid information further analyzes a traffic condition based on candidate vehicle sensing data and floating vehicle data respectively reported by a sensing device and a positioning device, to generate a dynamic parameter. The dynamic parameter includes an error-degree threshold and a confidence threshold that are for calculating a relative location error degree, and further includes a preset distance threshold, an error-degree threshold of a vehicle-following mode, and a confidence threshold of the vehicle-following mode that are for determining the vehicle-following mode. The unit for counting grid information further performs, through Kalman filter processing, data preprocessing on the candidate vehicle sensing data and the floating vehicle data respectively reported by the sensing device and the positioning device. The unit for counting grid information obtains the floating vehicle data collected frame by frame by the positioning device in a target vehicle, where the floating vehicle data includes a geographic location of the target vehicle. The unit for counting grid information determines, from the preset geographic-grid set, a target geographic grid in which the geographic location that is at a current frame moment is located, where the geographic-grid set includes the plurality of geographic grids, and the sensing device is respectively deployed in each geographic grid. The unit for counting grid information determines, based on a preset manner of determining an adjacent geographic grid, at least one neighboring geographic grid adjacent to the target geographic grid. A candidate geographic region covering the target geographic grid is determined based on the target geographic grid and the at least one neighboring geographic grid. The unit for counting grid information obtains, for each geographic grid in the candidate geographic region, candidate vehicle sensing data of at least one candidate vehicle that is collected by the sensing device in the geographic grid.

The server traverses candidate vehicle sensing data that is of the at least one candidate vehicle and that is at a previous frame moment, and reads an identifier of the vehicle-following mode from the traversed candidate vehicle sensing data; and in a case that it is detected, through the traversal, that the identifier of the vehicle-following mode exists in the candidate vehicle sensing data that is at the previous frame moment, in other words, when it is determined, based on the candidate vehicle sensing data that is of the at least one candidate vehicle and that is at the previous frame moment, that a candidate vehicle in the candidate vehicle in the candidate geographic region is in the vehicle-following mode at the previous frame moment, the server determines a physical distance between the candidate vehicle in the vehicle-following mode and the target vehicle based on the floating vehicle data and candidate vehicle sensing data that are at the current frame moment. The vehicle-following mode is configured for representing that a vehicle successfully matches the corresponding candidate vehicle at the previous frame moment, a relative location error degree between the corresponding candidate vehicle and the successfully matching vehicle satisfies a preset error-degree threshold condition of the vehicle-following mode at the previous frame moment, and a matching confidence between the corresponding candidate vehicle and the successfully matching vehicle satisfies a preset confidence threshold condition of the vehicle-following mode at the previous frame moment.

In a case that the physical distance is not greater than a preset distance threshold, it is determined that the candidate vehicle in the vehicle-following mode successfully matches the target vehicle, and the candidate vehicle in the vehicle-following mode remains in the vehicle-following mode at the current frame moment.

In a case that the physical distance is greater than the preset distance threshold, or in a case that the identifier of the vehicle-following mode is not read after the traversing ends, the server determines that the candidate vehicle in the candidate geographic region is not in the vehicle-following mode at the previous frame moment. For each candidate vehicle, the unit for matching a relative location error degree in the server determines a relative location error degree of the candidate vehicle based on sub error degrees of the candidate vehicle that respectively correspond to dimensions and by fusing the sub error degrees in the dimensions. A sub error degree corresponding to the distance dimension is a distance error degree, a sub error degree corresponding to the direction dimension is an azimuth error degree, a sub error degree corresponding to the speed dimension is a speed error degree, and a sub error degree corresponding to the trajectory dimension is a trajectory error degree.

Specifically, target vehicle feature data includes a geographic location, an azimuth, and a speed of the target vehicle, and the candidate vehicle feature data includes a geographic location, an azimuth, and a speed of the candidate vehicle. For each candidate vehicle, the unit for matching a relative location error degree calculates a straight-line distance between the candidate vehicle and the target vehicle respectively based on a geographic location that is of the candidate vehicle and that is at the current frame moment and the geographic location that is of the target vehicle and that is at the current frame moment; and calculates the distance error degree between the candidate vehicle and the target vehicle based on the straight-line distance when the straight-line distance is less than a preset straight-line distance threshold. For each candidate vehicle, the unit for matching a relative location error degree calculates an azimuth difference between the candidate vehicle and the target vehicle respectively based on an azimuth that is of the candidate vehicle and that is at the current frame moment and an azimuth that is of the target vehicle and that is at the current frame moment; and calculates the azimuth error degree between the candidate vehicle and the target vehicle based on the azimuth difference when the azimuth difference is less than a preset azimuth difference threshold. For each candidate vehicle, the unit for matching a relative location error degree calculates a speed difference between the candidate vehicle and the target vehicle respectively based on a speed that is of the candidate vehicle and that is at the current frame moment and a speed that is of the target vehicle and that is at the current frame moment; and calculates the speed error degree between the candidate vehicle and the target vehicle based on the speed difference when the speed difference is less than a preset speed difference threshold. The unit for matching a relative location error degree determines a time period based on the current frame moment and a time step; calculates, for each candidate vehicle, a candidate trajectory of the candidate vehicle within the time period based on a first sampling frequency of the geographic location of the candidate vehicle, where the candidate trajectory includes geographic locations of the candidate vehicle that respectively correspond to sampling points in the time period; calculates a target trajectory of the target vehicle within the time period based on a second sampling frequency of the geographic location of the target vehicle, where the target trajectory includes geographic locations of the target vehicle that respectively correspond to the sampling points in the time period; calculates, for each candidate vehicle, a warping distance between the candidate trajectory of the candidate vehicle and the target trajectory of the target vehicle respectively based on the candidate trajectory of the candidate vehicle within the time period and the target trajectory of the target vehicle within the time period; and calculates the trajectory error degree between the candidate vehicle and the target vehicle based on the warping distance when the warping distance is less than a preset warping distance threshold.

The unit for matching a relative location error degree calculates the relative location error degree between the candidate vehicle and the target vehicle based on the distance error degree, the azimuth error degree, the speed error degree, and the trajectory error degree that correspond to the candidate vehicle. For each candidate vehicle, the unit for analyzing a matching confidence in the server correspondingly determines a weight value that is of the candidate vehicle and that is at the current frame moment based on the relative location error degree that is between the target vehicle and the candidate vehicle and that is at the current frame moment, where the weight value is negatively correlated with the relative location error degree that is between the candidate vehicle and the target vehicle and that is at the current frame moment; calculates a sum of the weight values that respectively correspond to the at least candidate vehicle and that are at the current frame moment; calculates, for each candidate vehicle, a proportion of the weight value that corresponds to the candidate vehicle and that is at the current frame moment to the sum; and determines, based on the proportion, a matching confidence that is between the target vehicle and each candidate vehicle and that is at the current frame moment.

For the candidate vehicle in the at least one candidate vehicle, in a case that the relative location error degree between the candidate vehicle and the target vehicle is greater than the error-degree threshold, or in a case that the matching confidence between the candidate vehicle and the target vehicle is less than the confidence threshold, the unit for analyzing a matching confidence determines that the candidate vehicle does not match the target vehicle.

When the relative location error degree between the candidate vehicle and the target vehicle is not greater than the error-degree threshold, and when the matching confidence between the candidate vehicle and the target vehicle is not less than the confidence threshold, the unit for analyzing a matching confidence determines that the candidate vehicle successfully matches the target vehicle. The unit for analyzing a matching confidence determines the candidate vehicle successfully matching the target vehicle as a host vehicle. When the relative location error degree between the host vehicle and the target vehicle satisfies the preset error-degree threshold condition of the vehicle-following mode and the matching confidence between the host vehicle and the target vehicle satisfies the preset confidence threshold condition of the vehicle-following mode at the current frame moment, the unit for analyzing a matching confidence determines that the host vehicle is in the vehicle-following mode. The unit for analyzing a matching confidence adds an identifier of the vehicle-following mode to candidate vehicle sensing data that is of the host vehicle and that is at the current frame moment.

The vehicle-infrastructure cooperation function unit obtains a vehicle identifier of the host vehicle that is sent by the unit for analyzing a matching confidence, generates warning message data and real-time twin data, and sends the warning message data and the real-time twin data to the positioning device as vehicle-infrastructure cooperation information.

In this embodiment, the floating vehicle data of the target vehicle is obtained, where the floating vehicle data is collected frame by frame by the positioning device in the target vehicle, and the floating vehicle data includes the geographic location of the target vehicle, so that the floating vehicle data respectively corresponding to each frame moment can be determined in real time. Therefore, the candidate geographic region covering the geographic location that is at the current frame moment can be effectively and accurately determined based on the geographic location. In this way, a vehicle in the candidate geographic region is directly determined as the candidate vehicle to be matched with the target vehicle. In addition, the sensing device deployed in the candidate geographic region collects the candidate vehicle sensing data of the at least one candidate vehicle in the candidate geographic region. The relative location error degree between the target vehicle and each candidate vehicle is calculated based on the floating vehicle data and that candidate vehicle sensing data that are at the current frame moment. In other words, a proximity degree between each candidate vehicle and the target vehicle can be intuitively reflected based on the relative location error degree between the target vehicle and each candidate vehicle. Further, to correct a matching error caused by the relative location error degree, credibility of each relative location error degree is considered. In other words, the matching confidence that is between the target vehicle and each candidate vehicle and that is at the current frame moment is calculated based on the relative location error degree that is between the target vehicle and each candidate vehicle and that is at the current frame moment. In other words, the credibility of each relative location error degree is further evaluated based on the matching confidence. In this way, the candidate vehicle whose relative location error degree with the target vehicle satisfies the error-degree threshold condition and whose matching confidence with the target vehicle satisfies the confidence threshold condition can be accurately selected from the at least one candidate vehicle. In this way, the selected candidate vehicle can be directly determined as the candidate vehicle successfully matching the target vehicle. In other words, the location of the target vehicle is optimally estimated based on the relative location error degree that can accurately reflect the proximity degree between each candidate vehicle and the target vehicle and the matching confidence that can be configured for accurately evaluating the credibility of the relative location error degree, to accurately match a vehicle, in other words, improve vehicle matching accuracy.

Although the operations in the flowcharts involved in the foregoing embodiments are displayed sequentially as indicated by arrows, the operations are not necessarily performed sequentially as indicated by the arrows. Unless otherwise explicitly specified in this specification, a sequence of performing the operations is not strictly limited, and the operations may be performed in another sequence. In addition, at least a part of the operations in the flowcharts involved in the foregoing embodiments may include a plurality of operations or a plurality of stages. These operations or stages are not necessarily performed simultaneously, but may be performed at different moments. These operations or stages are not necessarily performed sequentially, but may be performed in turn or alternately with other operations or at least a part of operations or stages in the other operations.

Based on a same inventive concept, an embodiment of this application further provides a vehicle matching apparatus, configured to implement the foregoing vehicle matching method. An implementation solution provided by the apparatus for resolving a problem is similar to the implementation solution recorded in the foregoing method. Therefore, for specific limitations on one or more following embodiments of the vehicle matching apparatus, refer to the limitations on the foregoing vehicle matching method. Details are not described herein again.

Figure 11:
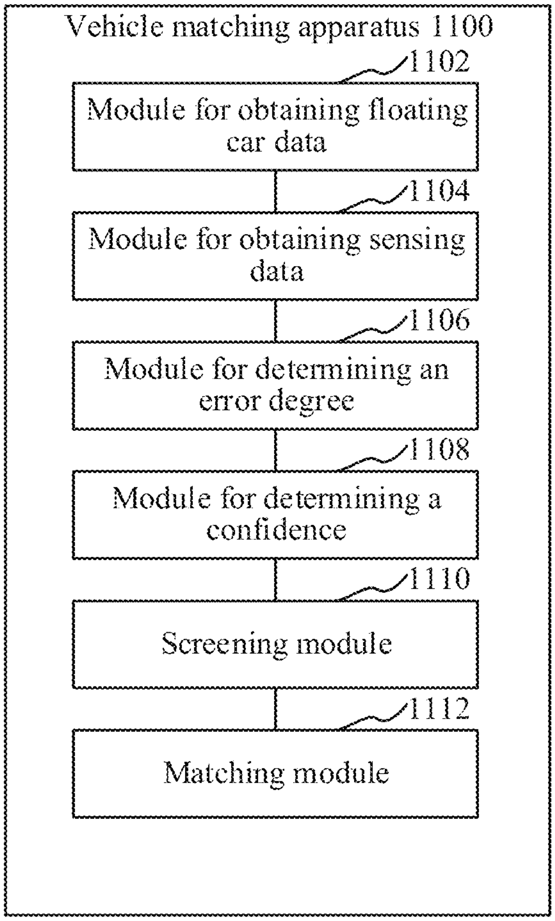
FIG. 11 is a block diagram of a structure of a vehicle matching apparatus according to an embodiment.

In an embodiment, as shown in FIG. 11, a vehicle matching apparatus 1100 is provided, including a module 1102 for obtaining floating vehicle data, a module 1104 for obtaining sensing data, a module 1106 for determining an error degree, a module 1108 for determining a confidence, a screening module 1110, and a matching module 1120.

The module 1102 for obtaining floating vehicle data is configured to obtain floating vehicle data of a target vehicle, the floating vehicle data being collected frame by frame by a positioning device in the target vehicle, and the floating vehicle data including a geographic location of the target vehicle.

The module 1104 for obtaining sensing data is configured to determine, based on a geographic location that is at a current frame moment, a candidate geographic region covering the geographic location, and obtain candidate vehicle sensing data of at least one candidate vehicle in the candidate geographic region, the candidate vehicle sensing data being collected frame by frame by a sensing device located in the candidate geographic region.

The module 1106 for determining an error degree is configured to calculate a relative location error degree between the target vehicle and each candidate vehicle based on the floating vehicle data and the candidate vehicle sensing data that are at the current frame moment.

The module 1108 for determining a confidence is configured to calculate a matching confidence that is between the target vehicle and each candidate vehicle and that is at the current frame moment based on the relative location error degree that is between the target vehicle and each candidate vehicle and that is at the current frame moment.

The screening module 1110 is configured to select, from the at least one candidate vehicle, a candidate vehicle whose relative location error degree with the target vehicle satisfies an error-degree threshold condition and whose matching confidence with the target vehicle satisfies a confidence threshold condition.

The matching module 1112 is configured to use the selected candidate vehicle as a candidate vehicle successfully matching the target vehicle at the current frame moment.

In some embodiments, the module 1104 for obtaining sensing data is configured to determine, from the preset geographic-grid set, the target geographic grid in which the geographic location that is at the current frame moment is located, where the geographic-grid set includes a plurality of geographic grids, and the sensing device is respectively deployed in each geographic grid; determine, based on at least the target geographic grid, the candidate geographic region covering the target geographic grid; and obtain, for each geographic grid in the candidate geographic region, the candidate vehicle sensing data of the at least one candidate vehicle that is collected by the sensing device in the geographic grid.

In some embodiments, the module 1104 for obtaining sensing data is configured to determine, based on a preset manner of determining an adjacent geographic grid, the at least one neighboring geographic grid adjacent to the target geographic grid; and determine, based on the target geographic grid and the at least one neighboring geographic grid, the candidate geographic region covering the target geographic grid.

In some embodiments, the apparatus further includes a module for determining a vehicle-following mode. The module for determining a vehicle-following mode is configured to: in a case that it is determined, based on candidate vehicle sensing data that is at the previous frame moment, that the candidate vehicle in the candidate geographic region is not in the vehicle-following mode at the previous frame moment, perform the operation of calculating a relative location error degree between the target vehicle and each candidate vehicle based on the floating vehicle data and the candidate vehicle sensing data that are at the current frame moment. The vehicle-following mode is configured for representing that a vehicle successfully matches the corresponding candidate vehicle at the previous frame moment, a relative location error degree between the corresponding candidate vehicle and the successfully matching vehicle satisfies a preset error-degree threshold condition of the vehicle-following mode at the previous frame moment, and a matching confidence between the corresponding candidate vehicle and the successfully matching vehicle satisfies a preset confidence threshold condition of the vehicle-following mode at the previous frame moment.

In some embodiments, the module for determining a vehicle-following mode is further configured to traverse candidate vehicle sensing data that is of the at least one candidate vehicle and that is at the previous frame moment, and read an identifier of the vehicle-following mode from the traversed candidate vehicle sensing data; and in a case that the identifier of the vehicle-following mode is not read after the traversing ends, determine that the candidate vehicle in the candidate geographic region is not in the vehicle-following mode at the previous frame moment.

In some embodiments, the module for determining a vehicle-following mode is further configured to: in a case that it is determined, based on the candidate vehicle sensing data that is at the previous frame moment, that a candidate vehicle in the candidate vehicle in the candidate geographic region is in the vehicle-following mode at the previous frame moment, determine a physical distance between the candidate vehicle in the vehicle-following mode and the target vehicle based on the floating vehicle data and candidate vehicle sensing data of the candidate vehicle in the vehicle-following mode that are at the current frame moment; and in a case that the physical distance is not greater than a preset distance threshold, determine that the candidate vehicle in the vehicle-following mode successfully matches the target vehicle, and cause the candidate vehicle in the vehicle-following mode to remain in the vehicle-following mode at the current frame moment.

In some embodiments, the module for determining a vehicle-following mode is further configured to: in a case that the physical distance is greater than the preset distance threshold, perform the operation of calculating a relative location error degree between the target vehicle and each candidate vehicle based on the floating vehicle data and the candidate vehicle sensing data that are at the current frame moment.

In some embodiments, the apparatus further includes an adding module. The adding module is configured to use the candidate vehicle successfully matching the target vehicle as a host vehicle; when the relative location error degree between the host vehicle and the target vehicle satisfies the preset error-degree threshold condition of the vehicle-following mode and the matching confidence between the host vehicle and the target vehicle satisfies the preset confidence threshold condition of the vehicle-following mode at the current frame moment, record that the host vehicle is in the vehicle-following mode; and add an identifier of the vehicle-following mode to candidate vehicle sensing data that is of the host vehicle and that is at the current frame moment.

In some embodiments, the module 1108 for determining a confidence is configured to calculate, for each candidate vehicle, a weight value that is of the candidate vehicle and that is at the current frame moment based on the relative location error degree that is between the target vehicle and the candidate vehicle and that is at the current frame moment, where the weight value is negatively correlated with the corresponding relative location error degree; and calculate, based on the weight value that respectively corresponds to the at least one candidate vehicle and that is at the current frame moment, the matching confidence that is between the target vehicle and each candidate vehicle and that is at the current frame moment, where the matching confidence is positively correlated with each weight value respectively.

In some embodiments, the module 1108 for determining a confidence is configured to calculate a sum of the weight values that respectively correspond to the at least one candidate vehicle and that are at the current frame moment; calculate, for each candidate vehicle, a proportion of the weight value that corresponds to the candidate vehicle and that is at the current frame moment to the sum; and determine, based on the proportion, the matching confidence that is between the target vehicle and each candidate vehicle and that is at the current frame moment.

In some embodiments, the satisfying an error-degree threshold condition is being not greater than a preset error-degree threshold. The matching module 1112 is further configured to determine, for a candidate vehicle in the at least one candidate vehicle, that the candidate vehicle does not match the target vehicle when a relative location error degree between the candidate vehicle and the target vehicle is greater than the error-degree threshold.

In some embodiments, the satisfying a confidence threshold condition is being not less than a preset confidence threshold. The matching module 1112 is further configured to determine, for a candidate vehicle in the at least one candidate vehicle, that the candidate vehicle does not match the target vehicle when a matching confidence between the candidate vehicle and the target vehicle is less than the confidence threshold.

In some embodiments, the module 1106 for determining an error degree is configured to obtain, based on the floating vehicle data that is at the current frame moment, target vehicle feature data in a plurality of dimensions that is of the target vehicle and that is at the current frame moment, where the target vehicle feature data is configured for representing a relative vehicle location relationship for the target vehicle; obtain, based on the candidate vehicle sensing data that is of each candidate vehicle and that is at the current frame moment, candidate vehicle feature data in the plurality of dimensions that is of each candidate vehicle and that is at the current frame moment, where the candidate vehicle feature data in the plurality of dimensions corresponds to the target vehicle feature data in the plurality of dimensions; calculate feature error degrees in the plurality of dimensions based on the target vehicle feature data in the plurality of dimensions that is at the current frame moment and the candidate vehicle feature data in the plurality of dimensions that is of each candidate vehicle and that is at the current frame moment; and calculate the relative location error degree between the target vehicle and each candidate vehicle based on the feature error degrees in the plurality of dimensions.

In some embodiments, the target vehicle feature data includes the geographic location of the target vehicle, the candidate vehicle feature data includes a geographic location of the corresponding candidate vehicle, and the feature error degrees in the plurality of dimensions include a distance error degree. The distance error degree is determined through an operation of determining the distance error degree. The apparatus further includes a module for determining a distance error degree. The module for determining a distance error degree is configured to calculate, for each candidate vehicle, a straight-line distance between the candidate vehicle and the target vehicle respectively based on a geographic location that is of the candidate vehicle and that is at the current frame moment and the geographic location that is of the target vehicle and that is at the current frame moment; and calculate the distance error degree between the candidate vehicle and the target vehicle based on the straight-line distance when the straight-line distance is less than a preset straight-line distance threshold.

In some embodiments, the target vehicle feature data includes an azimuth of the target vehicle, the candidate vehicle feature data includes an azimuth of the corresponding candidate vehicle, and the feature error degrees in the plurality of dimensions include an azimuth error degree. The azimuth error degree is determined through an operation of determining the azimuth error degree. The apparatus further includes a module for determining an azimuth error degree. The module for determining an azimuth error degree is configured to calculate, for each candidate vehicle, an azimuth difference between the candidate vehicle and the target vehicle respectively based on an azimuth that is of the candidate vehicle and that is at the current frame moment and an azimuth that is of the target vehicle and that is at the current frame moment; and calculate the azimuth error degree between the candidate vehicle and the target vehicle based on the azimuth difference when the azimuth difference is less than a preset azimuth difference threshold.

In some embodiments, the target vehicle feature data includes a speed of the target vehicle, the candidate vehicle feature data includes a speed of the corresponding candidate vehicle, and the feature error degrees in the plurality of dimensions include a speed error degree. The speed error degree is determined through an operation of determining the speed error degree. The apparatus further includes a module for determining a speed error degree. The module for determining a speed error degree is configured to calculate, for each candidate vehicle, a speed difference between the candidate vehicle and the target vehicle respectively based on a speed that is of the candidate vehicle and that is at the current frame moment and a speed that is of the target vehicle and that is at the current frame moment; and determine the speed error degree between the candidate vehicle and the target vehicle based on the speed difference when the speed difference is less than a preset speed difference threshold.

In some embodiments, the target vehicle feature data includes the geographic location of the target vehicle, the candidate vehicle feature data includes a geographic location of the corresponding candidate vehicle, and the feature error degrees in the plurality of dimensions include a trajectory error degree. The trajectory error degree is determined through an operation of determining the trajectory error degree. The apparatus further includes a module for determining a trajectory error degree. The module for determining a trajectory error degree is configured to determine a time period based on the current frame moment and a time step; determine, for each candidate vehicle, a candidate trajectory of the candidate vehicle within the time period based on a first sampling frequency of the geographic location of the candidate vehicle, where the candidate trajectory includes geographic locations of the candidate vehicle that respectively correspond to sampling points in the time period; determine a target trajectory of the target vehicle within the time period based on a second sampling frequency of the geographic location of the target vehicle, where the target trajectory includes geographic locations of the target vehicle that respectively correspond to the sampling points in the time period; calculate, for each candidate vehicle, a warping distance between the candidate trajectory and the target trajectory respectively based on the candidate trajectory of the candidate vehicle within the time period and the target trajectory of the target vehicle within the time period; and calculate the trajectory error degree between the candidate vehicle and the target vehicle based on the warping distance when the warping distance is less than a preset warping distance threshold.

All or a part of the modules in the foregoing vehicle matching apparatus for may be implemented by using software, hardware, or a combination thereof. The foregoing modules may be built in or independent of a processor in a computer device in a form of hardware, or may be stored in a memory in the computer device in a form of software, so that the processor invokes and executes the operations corresponding to the foregoing modules.

In an embodiment, a computer device is provided. The computer device may be a server, and an internal structure diagram thereof may be shown in FIG. 12. The computer device includes a processor, a memory, an input/output (I/O for short) interface, and a communication interface. The processor, the memory, and the input/output interface are connected through a system bus, and the communication interface is connected to the system bus through the input/output interface. The processor of the computer device is configured to provide computing and control capabilities. The memory of the computer device includes a non-volatile storage medium and an internal memory. The non-volatile storage medium has an operating system, computer-readable instructions, and a database stored therein. The internal memory provides an environment for running of the operating system and the computer-readable instructions in the non-volatile storage medium. The I/O interface of the computer device is configured to exchange information between the processor and an external device. The communication interface of the computer device is configured to connect and communicate with an external terminal via a network. The computer-readable instructions, when executed by the processor, implement a vehicle matching method.

Figure 12:
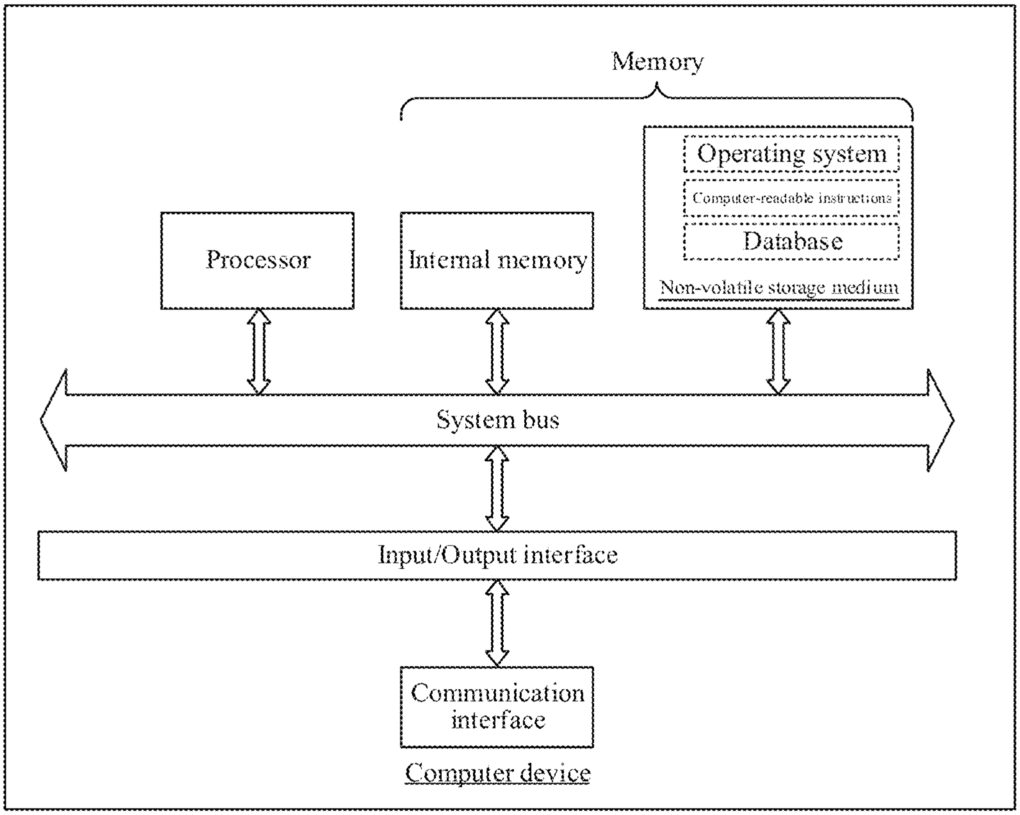
FIG. 12 is a diagram of an inner structure of a computer device according to an embodiment.

A person skilled in the art may understand that the structure shown in FIG. 12 is merely a block diagram of a part of structures related to the solutions of this application, but constitutes no limitation on the computer device to which the solutions of this application are applied. A specific computer device may include more or fewer components than those shown in the figure, or some components are combined, or in different component arrangements.

In an embodiment, a computer device is further provided, including a memory and a processor. The memory has computer-readable instructions stored therein, and the processor implements the operations in the foregoing method embodiments when executing the computer-readable instructions.

In an embodiment, a computer-readable storage medium is provided, having computer-readable instructions stored therein. The computer-readable instructions, when executed by a processor, implement the operations in the foregoing method embodiments.

In an embodiment, a computer program product is provided, including computer-readable instructions. The computer-readable instructions, when executed by a processor, implements the operations in the foregoing method embodiments.

User information (including, but not limited to, information about user equipment, user personal information, and the like) and data (including, but not limited to, data for analysis, stored data, displayed data, and the like) involved in this application are all information and data authorized by a user or fully authorized by all parties, and collection, use, and processing of relevant data need to comply with relevant laws, regulations, and standards of relevant countries and regions.

A person of ordinary skill in the art may understand that all or some of the procedures in the methods in the foregoing embodiments may be implemented by computer-readable instructions instructing relevant hardware. The computer-readable instructions may be stored in a non-volatile computer-readable storage medium. When the computer-readable instructions are executed, the procedures of the foregoing method embodiments may be implemented. Any reference to the memory, the database, or another medium used in the embodiments provided in this application may include at least one of a non-volatile memory or a volatile memory. The non-volatile memory may include a read-only memory (ROM), a magnetic tape, a floppy disk, a flash memory, an optical memory, a high-density embedded non-volatile memory, a resistive random-access memory (ReRAM), a magnetoresistive random access memory (MRAM), a ferroelectric random access memory (FRAM), a phase change memory (PCM), a graphene memory, or the like. The volatile memory may include a random access memory (RAM) or an external cache. As an illustration rather than a limitation, the RAM may be in a plurality of forms, such as a static random access memory (SRAM) or a dynamic random access memory (DRAM). The database involved in the embodiments provided in this application may include at least one of a relational database or a non-relational database. The non-relational database may include a blockchain-based distributed database, or the like. This is not limited thereto. The processor involved in the embodiments provided in this application may be a general-purpose processor, a central processing unit, a graphics processor, a digital signal processor, a programmable logic device, a data processing logic device based on quantum computing, or the like. This is not limited thereto.

Technical features of the foregoing embodiments may be combined in different manners to form other embodiments. To make the descriptions simple, not all possible combinations of the technical features in the foregoing embodiments are described. However, provided that there is no conflict in the combinations of these technical features, the combinations are to be considered as falling within the scope recorded in this specification.

The foregoing embodiments show only several implementations of this application, and are described in detail, but are not to be construed as a limitation on the patent scope of this application. For a person of ordinary skill in the art, several variations and improvements may be made without departing from the idea of this application. These variations and improvements all fall within the protection scope of this application. Therefore, the protection scope of this application is subject to the claims.

What is claimed is:

1. A vehicle matching method, performed by a server, comprising:

obtaining floating vehicle data of a target vehicle, the floating vehicle data being collected frame by frame by a positioning device in the target vehicle, and the floating vehicle data including a geographic location of the target vehicle;

determining, based on a current geographic location of the target vehicle at a current frame moment, a candidate geographic region covering the current geographic location;

obtaining candidate vehicle sensing data of at least one candidate vehicle in the candidate geographic region, the candidate vehicle sensing data being collected frame by frame by at least one sensing device located in the candidate geographic region;

for each of the at least one candidate vehicle:

calculating a relative location error degree between the target vehicle and the candidate vehicle based on the floating vehicle data at the current frame moment and the candidate vehicle sensing data at the current frame moment;

calculating a weight value of the candidate vehicle at the current frame moment based on the relative location error degree between the target vehicle and the candidate vehicle at the current frame moment, the weight value being negatively correlated with the relative location error degree; and calculating, based on the weight value at the current frame moment, a matching confidence between the target vehicle and the candidate vehicle at the current frame moment, the matching confidence being positively correlated with the weight value;

selecting, from the at least one candidate vehicle, a matching candidate vehicle that successfully matches the target vehicle at the current frame moment, the relative location error degree of the matching candidate vehicle satisfying an error-degree threshold condition, and the matching confidence of the matching candidate vehicle satisfying a confidence threshold condition;

determining the matching candidate vehicle as a host vehicle and a vehicle surrounding the host vehicle as a surrounding vehicle at the current frame moment; and performing, in response to determining that a distance between the surrounding vehicle and the host vehicle satisfies a condition, active vehicle safety control on at least one of the host vehicle or the surrounding vehicle.

2. The method according to claim 1, wherein:

determining the candidate geographic region includes:

determining, from a preset geographic-grid set, a target geographic grid in which the current geographic location is located, the geographic-grid set including a plurality of geographic grids each arranged with a sensing device; and determining, based on at least the target geographic grid, the candidate geographic region covering the target geographic grid; and obtaining the candidate vehicle sensing data of the at least one candidate vehicle in the candidate geographic region includes:

obtaining, for each geographic grid in the candidate geographic region, the candidate vehicle sensing data of the at least one candidate vehicle that is collected by the sensing device in the geographic grid.

3. The method according to claim 2, wherein determining, based on at least the target geographic grid, the candidate geographic region covering the target geographic grid includes:

determining, based on a preset rule for determining adjacent geographic grids, at least one neighboring geographic grid adjacent to the target geographic grid; and determining, based on the target geographic grid and the at least one neighboring geographic grid, the candidate geographic region covering the target geographic grid.

4. The method according to claim 1, further comprising:

in response to determining that the at least one candidate vehicle is not in the vehicle-following mode at the previous frame moment, performing the operation of calculating the relative location error degree between the target vehicle and the candidate vehicle for each of the at least one candidate vehicle;

wherein a vehicle is in the vehicle-following mode in response to that a matching vehicle that successfully matches the vehicle exits, that a relative location error degree between the vehicle and the matching vehicle satisfies a preset vehicle-following mode error-degree threshold condition of the vehicle-following mode, and that a matching confidence between the vehicle and the matching vehicle satisfies a preset vehicle-following mode confidence threshold condition.

5. The method according to claim 4, further comprising:

examining candidate vehicle sensing data of the at least one candidate vehicle at the previous frame moment, to determine if the candidate vehicle sensing data of the at least one candidate vehicle at the previous frame moment includes a vehicle-following mode identifier; and in response to determining that no vehicle-following mode identifier after the examining ends, determining that the at least one candidate vehicle is not in the vehicle-following mode at the previous frame moment.

6. The method according to claim 4, further comprising:

in response to determining that one candidate vehicle of the at least one candidate vehicle is in the vehicle-following mode at the previous frame moment, determining a physical distance between the one candidate vehicle and the target vehicle based on the floating vehicle data at the current frame moment and the candidate vehicle sensing data of the one candidate vehicle at the current frame moment; and in response to the physical distance being not greater than a preset distance threshold, determining that the one candidate vehicle successfully matches the target vehicle, and maintaining the vehicle-following mode for the one candidate vehicle at the current frame moment.

7. The method according to claim 6, further comprising:

in response to the physical distance being greater than the preset distance threshold, performing the operation of calculating the relative location error degree between the target vehicle and the candidate vehicle for each of the at least one candidate vehicle.

8. The method according to claim 1, further comprising:

in response to the relative location error degree between the matching candidate vehicle and the target vehicle satisfying a preset vehicle-following mode error-degree threshold condition and the matching confidence between the matching candidate vehicle and the target vehicle satisfying a preset vehicle-following mode confidence threshold condition at the current frame moment, recording that the matching candidate vehicle is in a vehicle-following mode; and adding a vehicle-following mode identifier to candidate vehicle sensing data of the matching candidate vehicle at the current frame moment.

9. The method according to claim 1, wherein for each of the at least one candidate vehicle, calculating, based on the weight value at the current frame moment, the matching confidence at the current frame moment includes:

calculating a sum of the at least one weight value respectively corresponding to the at least one candidate vehicle at the current frame moment; and for each of the at least one candidate vehicle:

calculating a proportion of the weight value corresponding to the candidate vehicle at the current frame moment to the sum; and determining, based on the proportion, the matching confidence between the target vehicle and the candidate vehicle at the current frame moment.

10. The method according to claim 1, further comprising:

determining, for one candidate vehicle of the at least one candidate vehicle, that the one candidate vehicle does not match the target vehicle in response to a relative location error degree between the one candidate vehicle and the target vehicle being greater than a preset error-degree threshold.

11. The method according to claim 1, further comprising:

determining, for one candidate vehicle of the at least one candidate vehicle, that the one candidate vehicle does not match the target vehicle in response to a matching confidence between the one candidate vehicle and the target vehicle being less than a preset confidence threshold.

12. The method according to claim 1, wherein for each of the at least one candidate vehicle, calculating the relative location error degree includes:

obtaining, based on the floating vehicle data at the current frame moment, multi-dimensional target vehicle feature data of the target vehicle at the current frame moment, the multi-dimensional target vehicle feature data representing a relative vehicle location relationship for the target vehicle; and for each of the at least one candidate vehicle:

obtaining, based on the candidate vehicle sensing data of the candidate vehicle at the current frame moment, multi-dimensional candidate vehicle feature data of the candidate vehicle at the current frame moment, the multi-dimensional candidate vehicle feature data corresponding to the multi-dimensional target vehicle feature data;

calculating multi-dimensional feature error degrees based on the multi-dimensional target vehicle feature data at the current frame moment and the multi-dimensional candidate vehicle feature data of the candidate vehicle at the current frame moment; and calculating the relative location error degree between the target vehicle and the candidate vehicle based on the multi-dimensional feature error degrees.

13. The method according to claim 12, wherein:

the multi-dimensional target vehicle feature data includes the geographic location of the target vehicle, the multi-dimensional candidate vehicle feature data includes a geographic location of the corresponding candidate vehicle, and the multi-dimensional feature error degrees include a distance error degree; and the distance error degree of one candidate vehicle of the at least one candidate vehicle is determined by:

calculating a straight-line distance between the one candidate vehicle and the target vehicle based on a geographic location of the one candidate vehicle at the current frame moment and the geographic location of the target vehicle at the current frame moment; and calculating the distance error degree between the one candidate vehicle and the target vehicle based on the straight-line distance in response to the straight-line distance being less than a preset straight-line distance threshold.

14. The method according to claim 12, wherein:

the multi-dimensional target vehicle feature data includes an azimuth of the target vehicle, the multi-dimensional candidate vehicle feature data includes an azimuth of the corresponding candidate vehicle, and the multi-dimensional feature error degrees include an azimuth error degree; and the azimuth error degree of one candidate vehicle of the at least one candidate vehicle is determined by:

calculating an azimuth difference between the one candidate vehicle and the target vehicle based on an azimuth of the one candidate vehicle at the current frame moment and an azimuth of the target vehicle at the current frame moment; and calculating the azimuth error degree between the one candidate vehicle and the target vehicle based on the azimuth difference in response to the azimuth difference being less than a preset azimuth difference threshold.

15. The method according to claim 12, wherein:

the multi-dimensional target vehicle feature data includes a speed of the target vehicle, the multi-dimensional candidate vehicle feature data includes a speed of the corresponding candidate vehicle, and the multi-dimensional feature error degrees include a speed error degree; and the speed error degree of one candidate vehicle of the at least one candidate vehicle is determined by:

calculating a speed difference between the one candidate vehicle and the target vehicle based on a speed of the one candidate vehicle at the current frame moment and a speed of the target vehicle at the current frame moment; and determining the speed error degree between the one candidate vehicle and the target vehicle based on the speed difference in response to the speed difference being less than a preset speed difference threshold.

16. The method according to claim 12, wherein:

the multi-dimensional target vehicle feature data includes the geographic location of the target vehicle, the multi-dimensional candidate vehicle feature data includes a geographic location of the corresponding candidate vehicle, and the multi-dimensional feature error degrees include a trajectory error degree; and the trajectory error degree of one candidate vehicle of the at least one candidate vehicle is determined by:

determining a time period based on the current frame moment and a time step;

determining a candidate trajectory of the one candidate vehicle within the time period based on a first sampling frequency of the geographic location of the candidate vehicle, the candidate trajectory including geographic locations of the one candidate vehicle sampled in the time period;

determining a target trajectory of the target vehicle within the time period based on a second sampling frequency of the geographic location of the target vehicle, wherein the target trajectory includes geographic locations of the target vehicle sampled in the time period;

calculating a warping distance between the candidate trajectory and the target trajectory; and calculating the trajectory error degree between the one candidate vehicle and the target vehicle based on the warping distance in response to the warping distance being less than a preset warping distance threshold.

17. A computer device comprising:

one or more memories storing computer-readable instructions; and one or more processors configured to execute the computer-readable instructions to:

obtain floating vehicle data of a target vehicle, the floating vehicle data being collected frame by frame by a positioning device in the target vehicle, and the floating vehicle data including a geographic location of the target vehicle;

determine, based on a current geographic location of the target vehicle at a current frame moment, a candidate geographic region covering the current geographic location;

obtain candidate vehicle sensing data of at least one candidate vehicle in the candidate geographic region, the candidate vehicle sensing data being collected frame by frame by at least one sensing device located in the candidate geographic region;

for each of the at least one candidate vehicle:

calculate a relative location error degree between the target vehicle and the candidate vehicle based on the floating vehicle data at the current frame moment and the candidate vehicle sensing data at the current frame moment;

calculate a weight value of the candidate vehicle at the current frame moment based on the relative location error degree between the target vehicle and the candidate vehicle at the current frame moment, the weight value being negatively correlated with the relative location error degree; and calculate, based on the weight value at the current frame moment, a matching confidence between the target vehicle and the candidate vehicle at the current frame moment, the matching confidence being positively correlated with the weight value;

select, from the at least one candidate vehicle, a matching candidate vehicle that successfully matches the target vehicle at the current frame moment, the relative location error degree of the matching candidate vehicle satisfying an error-degree threshold condition, and the matching confidence of the matching candidate vehicle satisfying a confidence threshold condition;

determine the matching candidate vehicle as a host vehicle and a vehicle surrounding the host vehicle as a surrounding vehicle at the current frame moment; and perform, in response to determining that a distance between the surrounding vehicle and the host vehicle satisfies a condition, active vehicle safety control on at least one of the host vehicle or the surrounding vehicle.

18. The device according to claim 17, wherein the one or more processors are further configured to execute the computer-readable instructions to:

when determining the candidate geographic region:

determine, from a preset geographic-grid set, a target geographic grid in which the current geographic location is located, the geographic-grid set including a plurality of geographic grids each arranged with a sensing device; and determine, based on at least the target geographic grid, the candidate geographic region covering the target geographic grid; and when obtaining the candidate vehicle sensing data of the at least one candidate vehicle in the candidate geographic region:

obtain, for each geographic grid in the candidate geographic region, the candidate vehicle sensing data of the at least one candidate vehicle that is collected by the sensing device in the geographic grid.

19. A non-transitory computer-readable storage medium storing computer-readable instructions that, when executed by one or more processors, cause the one or more processors to:

obtain floating vehicle data of a target vehicle, the floating vehicle data being collected frame by frame by a positioning device in the target vehicle, and the floating vehicle data including a geographic location of the target vehicle;

determine, based on a current geographic location of the target vehicle at a current frame moment, a candidate geographic region covering the current geographic location;

obtain candidate vehicle sensing data of at least one candidate vehicle in the candidate geographic region, the candidate vehicle sensing data being collected frame by frame by at least one sensing device located in the candidate geographic region;

for each of the at least one candidate vehicle:

calculate a relative location error degree between the target vehicle and the candidate vehicle based on the floating vehicle data at the current frame moment and the candidate vehicle sensing data at the current frame moment;

calculate a weight value of the candidate vehicle at the current frame moment based on the relative location error degree between the target vehicle and the candidate vehicle at the current frame moment, the weight value being negatively correlated with the relative location error degree; and calculate, based on the weight value at the current frame moment, a matching confidence between the target vehicle and the candidate vehicle at the current frame moment, the matching confidence being positively correlated with the weight value;

select, from the at least one candidate vehicle, a matching candidate vehicle that successfully matches the target vehicle at the current frame moment, the relative location error degree of the matching candidate vehicle satisfying an error-degree threshold condition, and the matching confidence of the matching candidate vehicle satisfying a confidence threshold condition;

determine the matching candidate vehicle as a host vehicle and a vehicle surrounding the host vehicle as a surrounding vehicle at the current frame moment; and perform, in response to determining that a distance between the surrounding vehicle and the host vehicle satisfies a condition, active vehicle safety control on at least one of the host vehicle or the surrounding vehicle.

20. The method according to claim 1, wherein:

the floating vehicle data of the target vehicle is collected by the positioning device in real time, and comprises a location, traveling duration, a speed, an acceleration, and an azimuth of the target vehicle; and the candidate vehicle sensing data of each candidate vehicle in the candidate geographic region is obtained by the at least one sensing device in real time, and comprises a location, traveling duration, a speed, an acceleration, and an azimuth of the corresponding candidate vehicle.

* * * * *